US011172251B1

(12) United States Patent
Thomas et al.

(10) Patent No.: US 11,172,251 B1
(45) Date of Patent: Nov. 9, 2021

(54) METHOD AND APPARATUS FOR SYNTHESIZED VIDEO STREAM

(71) Applicant: Madly, Inc., Cupertino, CA (US)

(72) Inventors: Mark Thomas, Cupertino, CA (US); Abhijit Limaye, San Jose, CA (US); Dean Seniff, Frederick, MD (US); Jiahao Li, Cupertino, CA (US)

(73) Assignee: Madly, Inc., Cupertino, CA (US)

( * ) Notice: Subject to any disclaimer, the term of this patent is extended or adjusted under 35 U.S.C. 154(b) by 0 days.

(21) Appl. No.: 16/937,494

(22) Filed: Jul. 23, 2020

Related U.S. Application Data

(60) Provisional application No. 63/021,028, filed on May 6, 2020, provisional application No. 63/028,463, filed on May 21, 2020, provisional application No. 63/045,763, filed on Jun. 29, 2020, provisional application No. 63/050,702, filed on Jul. 10, 2020.

(51) Int. Cl.
*H04N 21/44* (2011.01)
*H04N 21/81* (2011.01)
*H04N 21/4788* (2011.01)
*G06F 16/51* (2019.01)
(Continued)

(52) U.S. Cl.
CPC ....... *H04N 21/44016* (2013.01); *G06F 16/51* (2019.01); *G06Q 30/0242* (2013.01); *G06Q 30/0255* (2013.01); *G06Q 30/0276* (2013.01); *H04N 7/15* (2013.01); *H04N 21/44008* (2013.01); *H04N 21/4788* (2013.01); *H04N 21/812* (2013.01)

(58) Field of Classification Search
CPC ......... H04N 21/44016; H04N 21/4788; H04N 7/15; H04N 21/812; H04N 21/44008; G06Q 30/0271; G06Q 30/0276
See application file for complete search history.

(56) References Cited

U.S. PATENT DOCUMENTS

2012/0154513 A1* 6/2012 Su .............................. G06F 3/01
348/14.07
2014/0320591 A1 10/2014 Baron, Jr. et al.
(Continued)

FOREIGN PATENT DOCUMENTS

JP   2010157906 A    7/2010
JP   2018157321 A    10/2018
KR   1020180062045 A  6/2018

OTHER PUBLICATIONS

International Search Report and Written Opinion for International Patent Application No. PCT/US21/31139, dated Sep. 24, 2021, 11 pages.

*Primary Examiner* — Kunal Langhnoja
(74) *Attorney, Agent, or Firm* — Elliott Ostrander & Preston, P.C.

(57) ABSTRACT

A synthesized, advertisement-based, video stream is generated first by receiving a video stream essentially consisting of a representative image of a person, a video stream comprising a place, and a video stream comprising an advertisement, and then combining the video stream essentially consisting of the representative image of the person with the video stream comprising the place and with the video stream comprising the advertisement into the synthesized, advertisement-based, video stream for transmission to an end-user device via which to display the synthesized, advertisement-based, video stream.

17 Claims, 15 Drawing Sheets

(51) Int. Cl.
*G06Q 30/02* (2012.01)
*H04N 7/15* (2006.01)

(56) References Cited

U.S. PATENT DOCUMENTS

| | | | |
|---|---|---|---|
| 2015/0020095 A1* | 1/2015 | Yoo | H04N 21/2668 |
| | | | 725/34 |
| 2015/0244987 A1 | 8/2015 | Delegue et al. | |
| 2017/0287226 A1* | 10/2017 | Du | G06K 9/00671 |

* cited by examiner

100A

101B

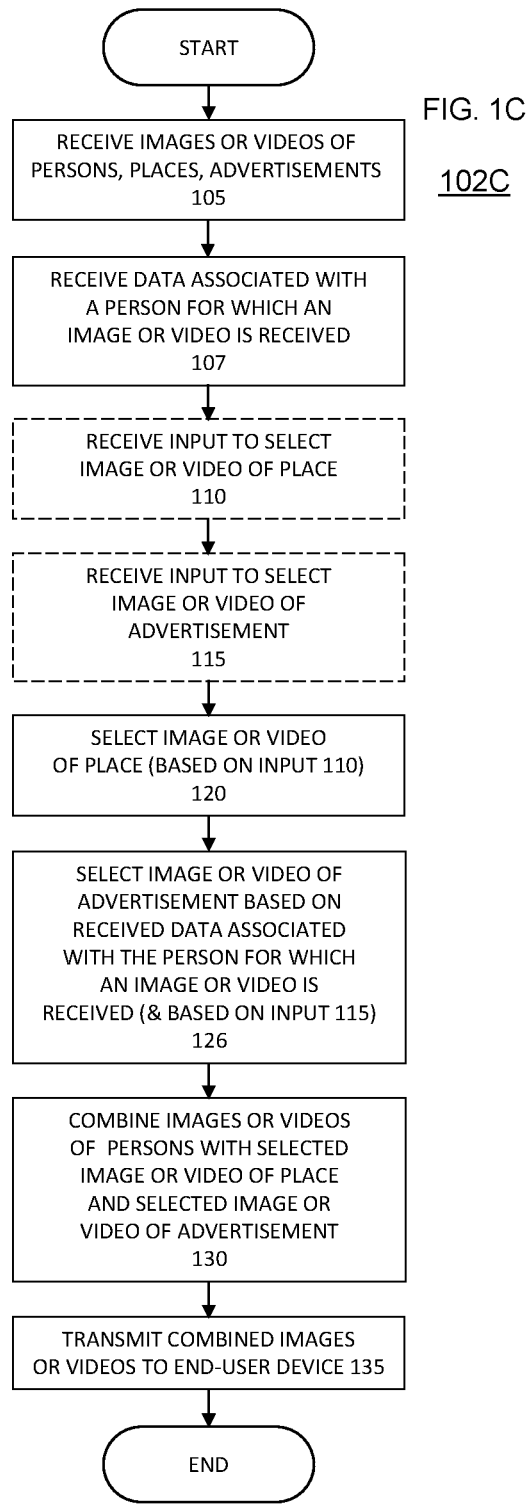

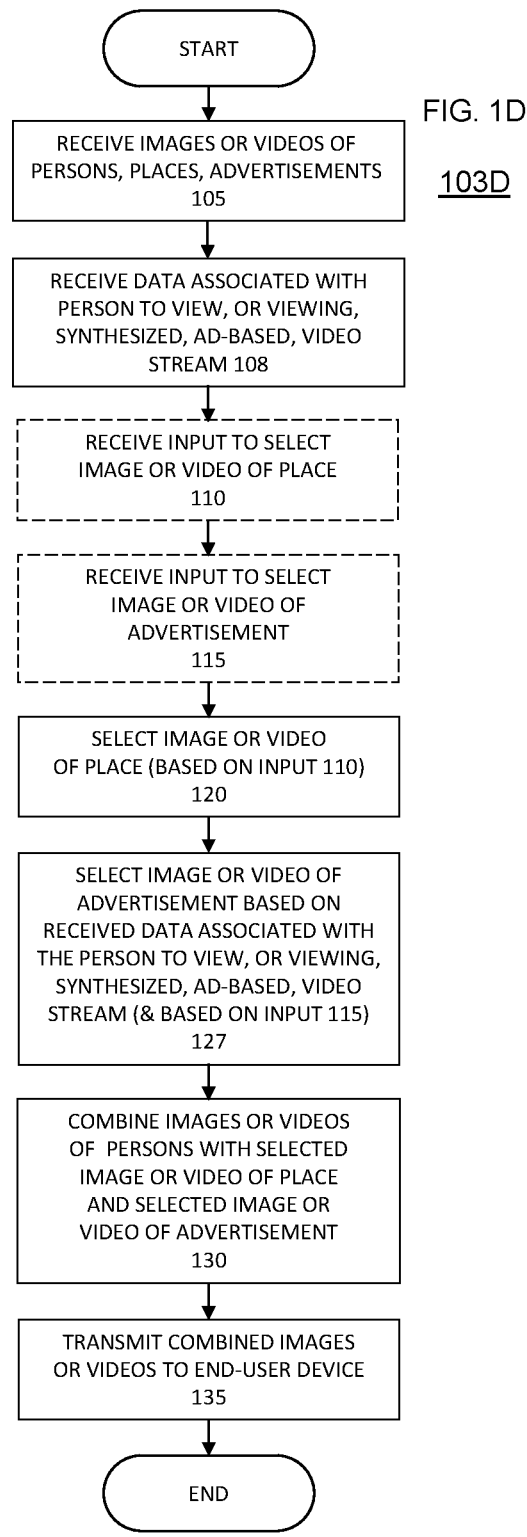

104E

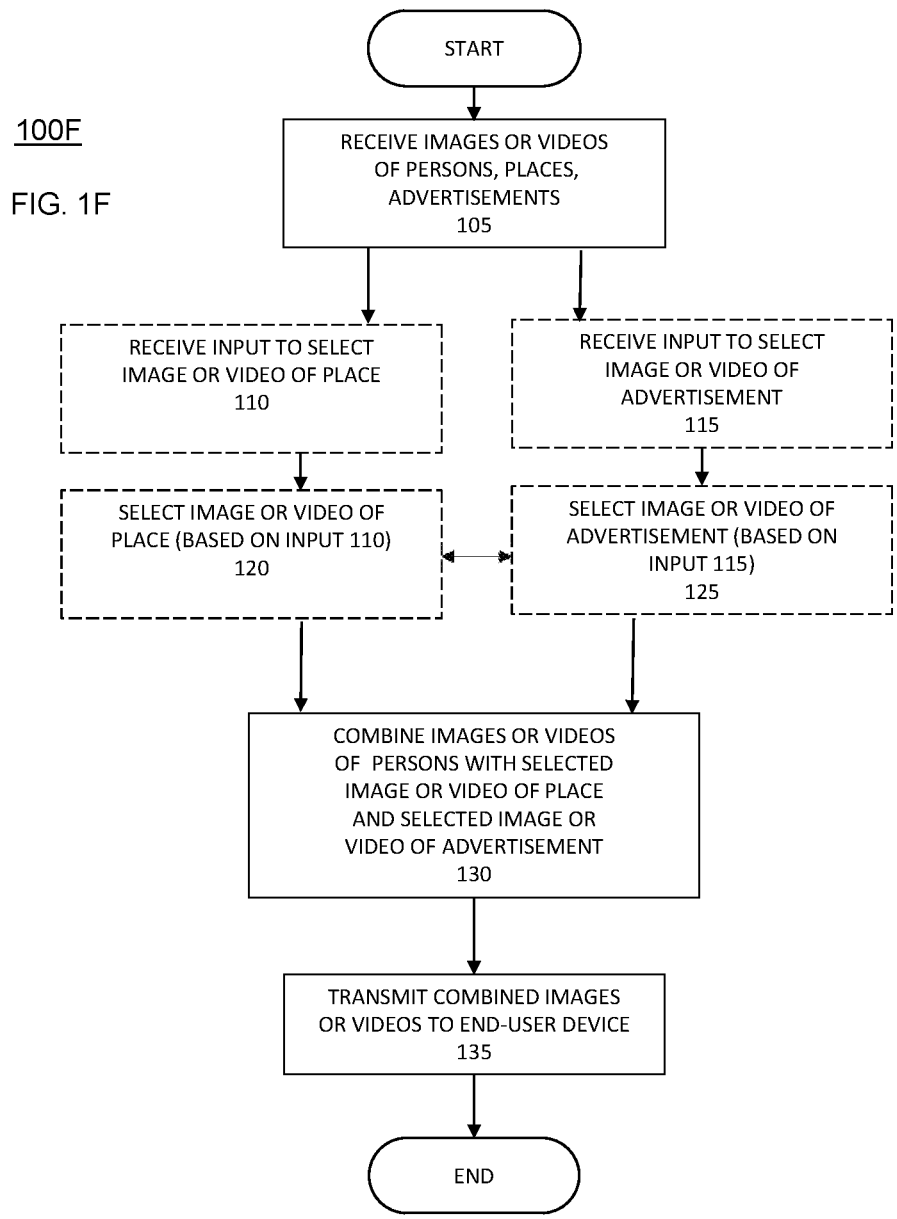

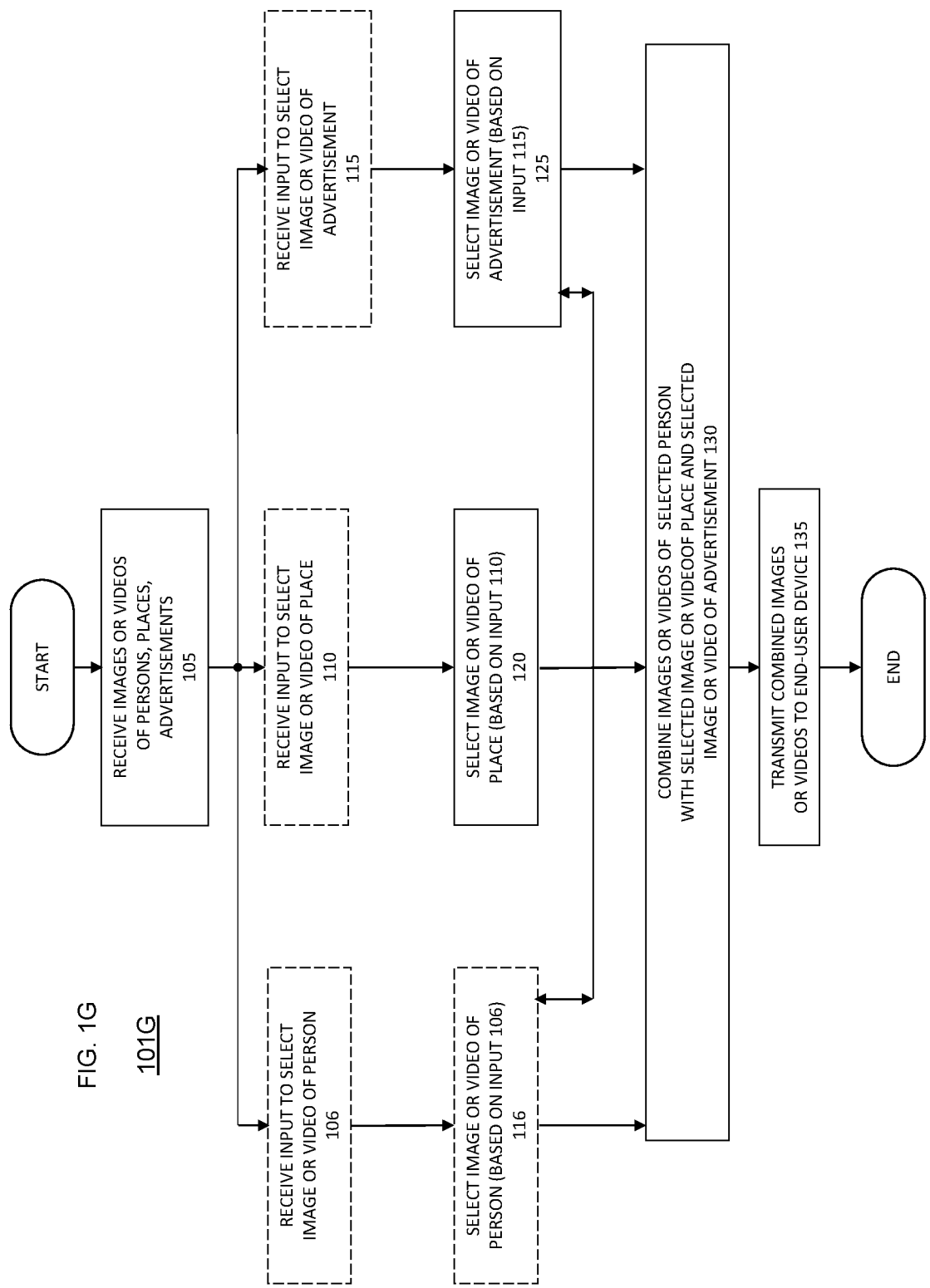

102H

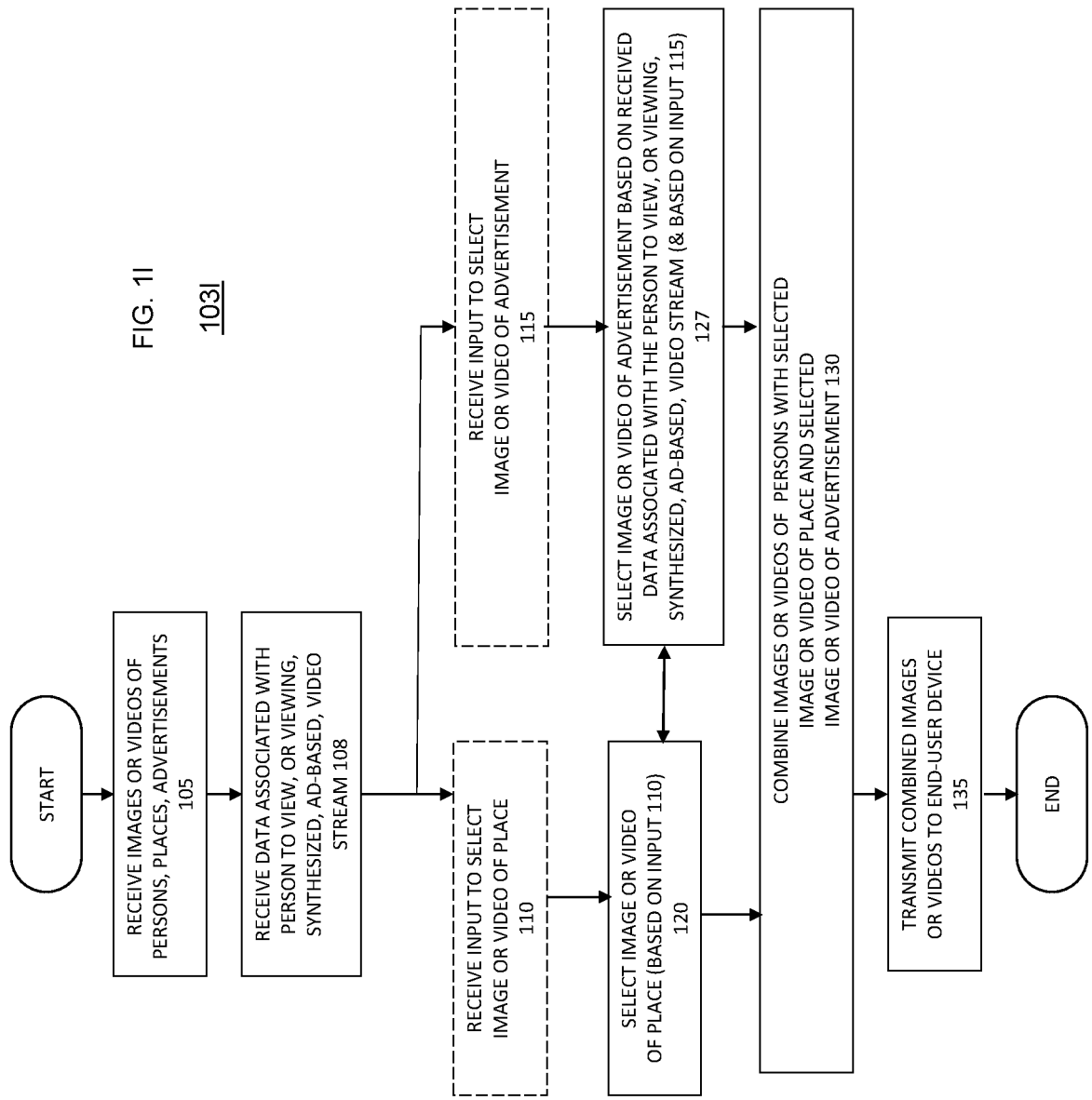

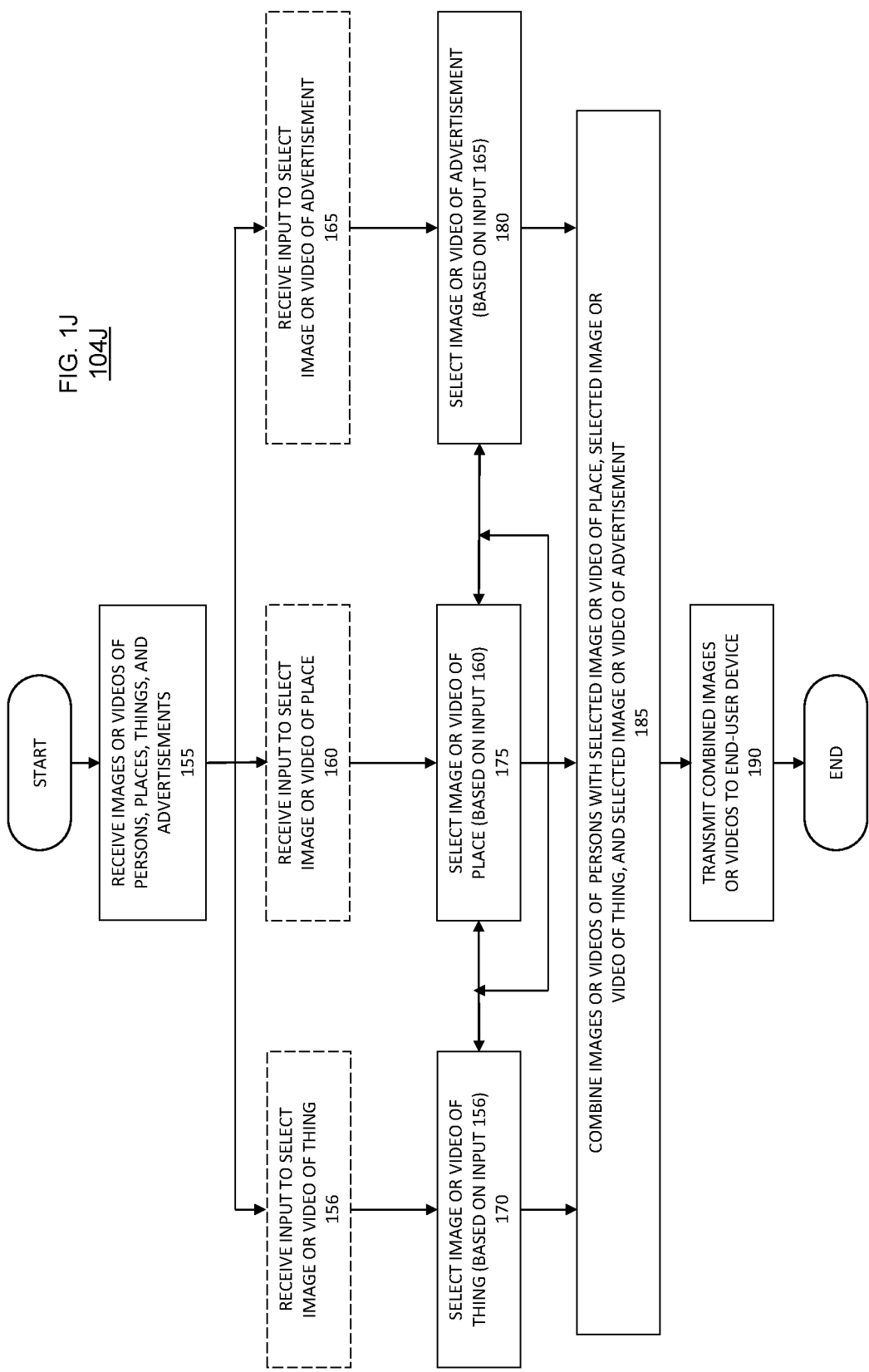

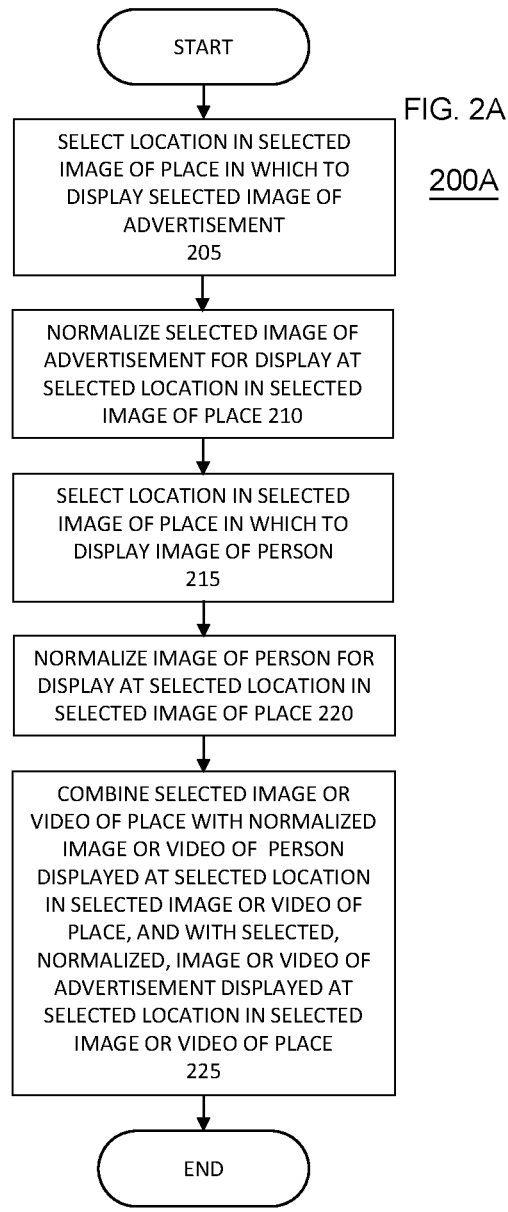

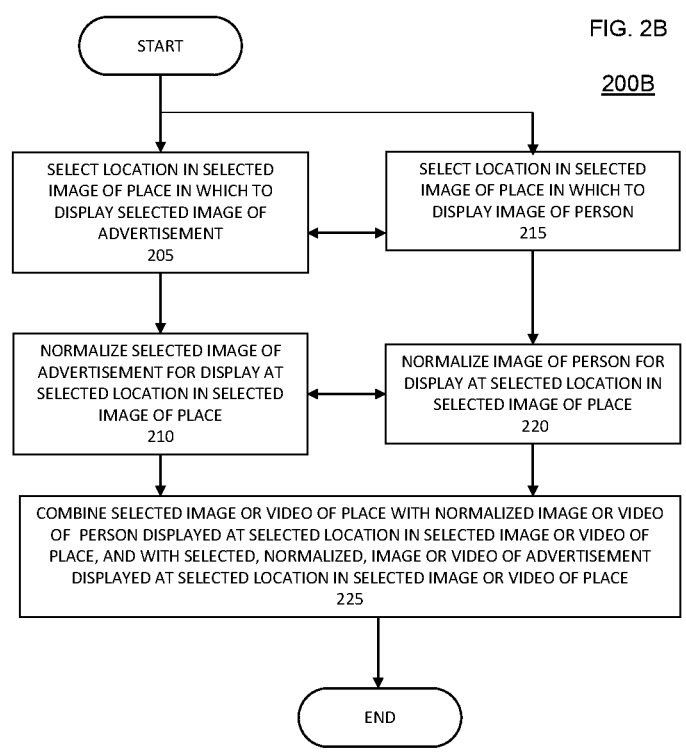

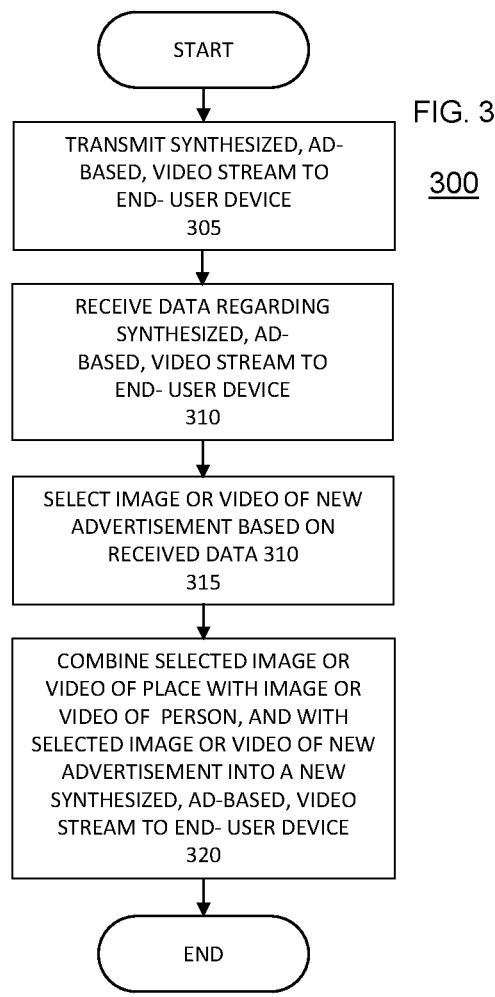

400

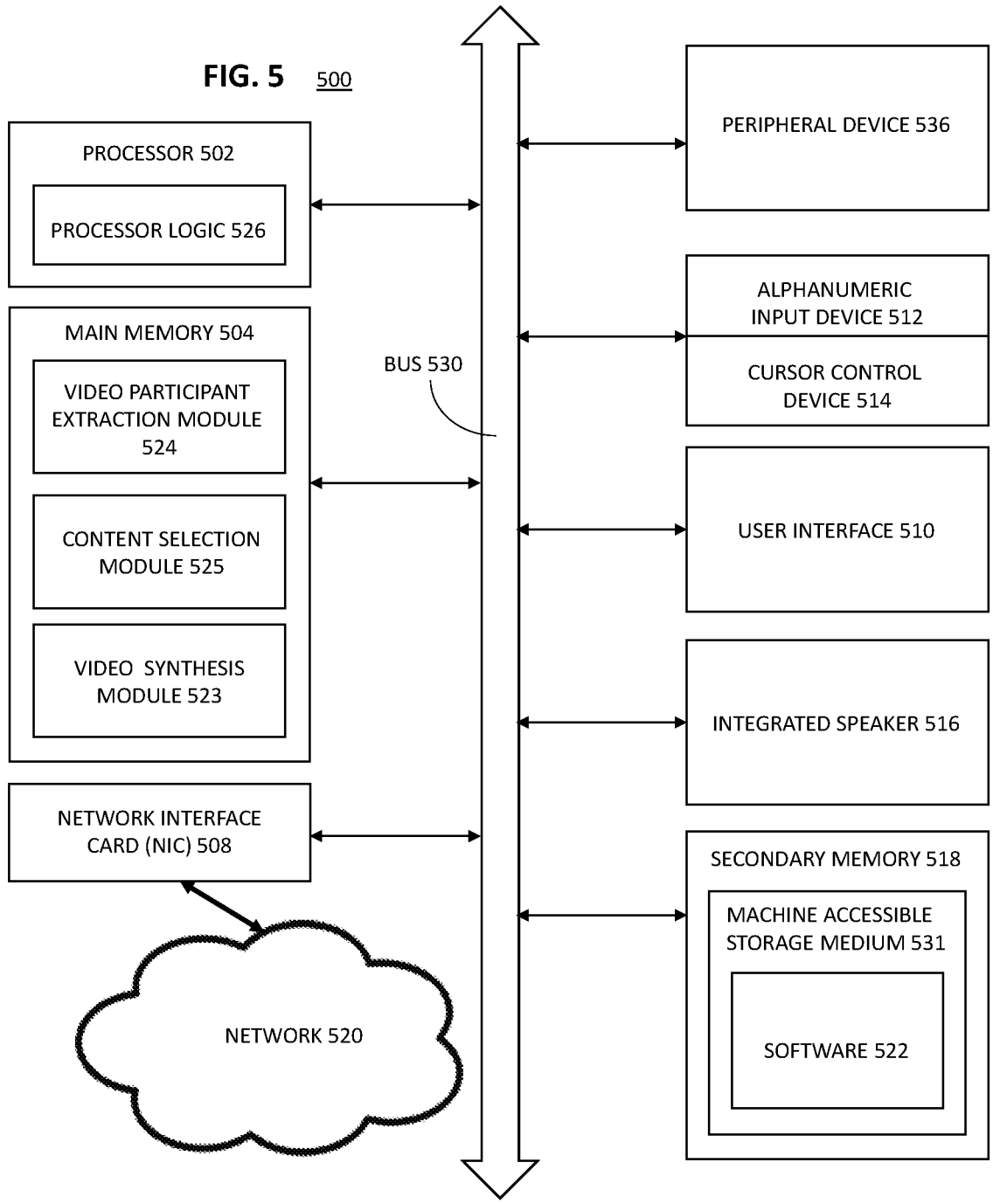

METHOD AND APPARATUS FOR SYNTHESIZED VIDEO STREAM

CLAIM OF PRIORITY

This non-provisional U.S. Utility patent application is related to, and claims priority to, provisional patent application No. 63/021,028 filed May 6, 2020, entitled "Method and Apparatus for Insertion of Advertising in Real-Time Synthesis of Video from Multiple Real-Time Video Streams and Pre-Recorded Streams", the contents of which are incorporated herein by reference, and is related to, and claims priority to, provisional patent application No. 63/028,463 filed May 21, 2020, entitled "Method and Apparatus for a Virtual Meeting Space", the contents of which are incorporated herein by reference, and is related to, and claims priority to, provisional patent application No. 63/045,763 filed Jun. 29, 2020, entitled "Method and Apparatus for a Virtual Meeting Space", the contents of which are incorporated herein by reference, and is related to, and claims priority to, provisional patent application No. 63/050,702 filed Jul. 10, 2020, entitled "Method and Apparatus for a Virtual Meeting Space", the contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate to combining separate digital images or video streams of persons, places, and things into a synthesized video stream. At least one digital image or video stream may include an image of an event, brand, or advertisement.

BACKGROUND

For years, since marketers started advertising a brand/product and/or a service, the medium for such advertising has been 'broadcast television'. This medium holds a mass-appeal since the TV signals are broadcast to millions of viewers simultaneously. However, measuring the effectiveness of an advertisement is a challenge, because it is difficult to tell whether or how a particular viewer responds to an advertisement in an open loop system, i.e., a system with no feedback.

Recent years have witnessed a major shift in which the internet has become the primary medium for advertising content, where advertisements are presented based on users' search interests or usage statistics. Internet platforms such as Google, Facebook/Instagram have become the new standard for internet advertising platforms. While measuring the key metrics in advertisement is easier with this medium compared to broadcast television, it is still not reliable, and advertisements can be considered a nuisance occupying and cluttering screen space unfavorably.

Video communications have evolved from the simple broadcast architecture of the 1950's to a distributed multicast/unicast architecture. One of the most popular type of video communications are the video streams that are indigenous to the video meeting platforms such as Zoom, WebEx, Microsoft Teams, etc. Video conferencing/meeting participants are spending billions of minutes per day on such platforms. In addition, there are many multi-cast video communications, e.g. podcasts, online classes, online fitness training. This medium holds the same mass-appeal as broadcast TV, but with unprecedented abilities to improve the standard advertisement metrics.

Though virtual audio/visual collaboration systems have improved over the years by improving on A/V quality and stability of operations, they are still far from reaching their true potential from both a user experience perspective and from an advertising medium effectiveness perspective.

A typical user experience for a video conference consists of an unnatural array of framed images of each participant's video stream. Some participants do not even turn on their video stream. There are a number of reasons for this, one of which is that the video participant may not want to expose or disclose his/her background setting to the other video participants. One solution to this problem has been to replace a participant's real background with a virtual background. As such it is possible to use a virtual background to hide the real background of the video participant. This is done by combining two video streams, in which the foreground portion of one video stream (including the video participant) is extracted (or equivalently the background is removed) and is superimposed onto a selected virtual background in another video stream. It is noteworthy that the foreground location does not move nor normalized to blend in more realistically with the virtual background. The quality of this process is at best tolerable under optimal conditions.

Currently the video conferencing industry only offers very modest choices of virtual backgrounds. Real time video streams, such as provided by video communication services for business situations (e.g., Zoom Video Conferencing Zoom, Cisco's Webex, Skype, RingCentral, GoToMeeting, 8×8, BlueJeans, join.me, UberConference, Fuze, GotToWebinar, etc.), or for personal or social media communications (e.g., a Tiktok story time, a Snapchat video clip, or an Instagram story), often focus on one or more individuals in the foreground of the video stream. The background for the business conferencing videos typically is a mundane office or conference room. There is a tremendous opportunity to create much more diverse and higher quality and more engaging virtual backgrounds in the form of virtual environments, including those that create a perception that the participants of the video call have some commonality between them, and/or a perception of being in the same room with each other, or a virtual environment that is dynamically programmed to the needs of the participants of the meeting.

What is needed is a method and apparatus to introduce an event, or programmable background sets to alter the environment of the meeting, including video events that make the virtual backgrounds more interesting and engaging, including but not limited to one or more advertisements, in the context of video collaboration/conferencing applications.

BRIEF DESCRIPTION OF THE DRAWINGS

Embodiments are illustrated by way of example, and not by way of limitation, and will be more fully understood with reference to the following detailed description when considered in connection with the figures in which:

FIG. 1C is a flowchart of a method in accordance with an embodiment of the invention;

FIG. 1D is a flowchart of a method in accordance with an embodiment of the invention;

FIG. 1F is a flowchart of a method in accordance with an embodiment of the invention;

FIG. 1G is a flowchart of a method in accordance with an embodiment of the invention;

FIG. 1I is a flowchart of a method in accordance with an embodiment of the invention;

FIG. 1J is a flowchart of a method in accordance with an embodiment of the invention;

FIG. 2A is a flowchart of a method in accordance with an embodiment of the invention;

FIG. 2B is a flowchart of a method in accordance with an embodiment of the invention;

FIG. 3 is a flowchart of a method in accordance with an embodiment of the invention;

FIG. 5 illustrates a diagrammatic representation of a machine in the exemplary form of a computer system, in accordance with one embodiment.

DETAILED DESCRIPTION

Embodiments of the invention provide for synthesizing one or more digital images or pre-recorded or live video streams of objects and persons. In one embodiment, the digital images or video streams of objects and people are based on three dimensional (3D) models in the context of video communications. One or more of these video streams of objects can be advertising content from marketers and advertisers. The synthesized video streams with advertisement content may have many applications; one of which is for video conferencing/meeting platforms. This synthesis may be accomplished in real time or it may be staged, or staggered in time, such that part of the synthesis containing objects and people from pre-recorded video and digital images may be accomplished in part or in entirety and saved at some time prior to the live real time stream. This allows for faster processing synthesis processing times which in turn results in lower latency times.

Figure 1A:
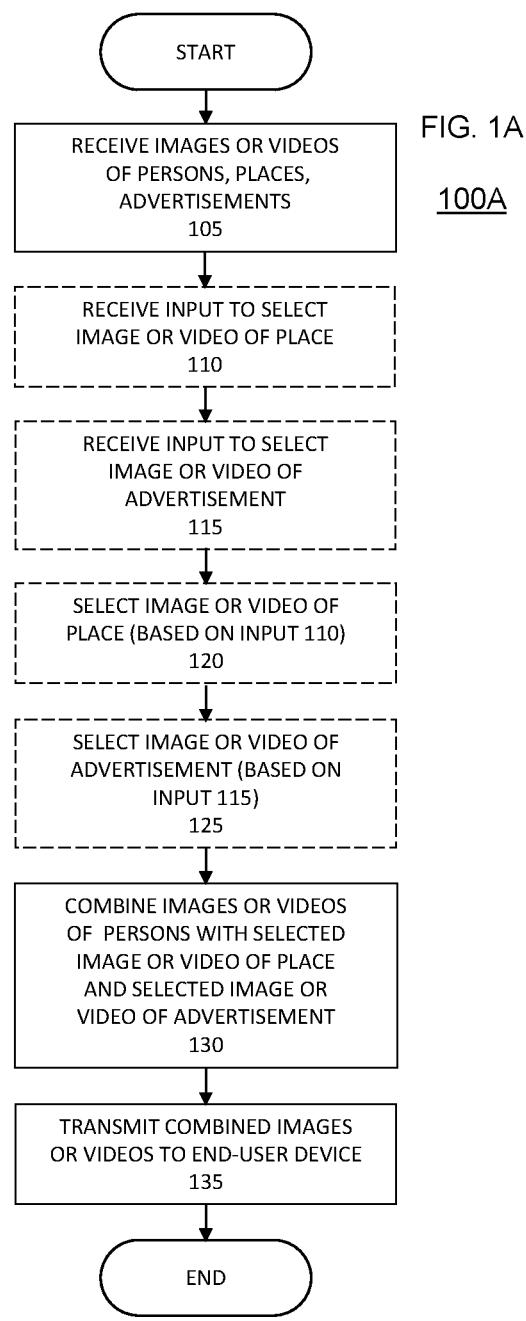
FIG. 1A is a flowchart of a method in accordance with an embodiment of the invention.

Embodiments of the invention include an apparatus and method for providing a synthesized, advertisement-based, video stream. An advertisement, which may also be referred to herein as advertisement content, is a notice or announcement in a public medium promoting a product, service, or event status or a need for service. An advertisement can be thought of as a type of event which advertises a product or service. With reference to FIG. 1A, an embodiment 100A receives at step 105 a digital image or video stream essentially consisting of a representative image of a person, a separate digital image or video stream comprising a place, such as a conference room, and a third digital image or video stream comprising an advertisement. The embodiment combines at step 130 the digital image or video stream essentially consisting of the representative image of the person with the digital image or video stream comprising the place and with the digital image or video stream comprising the advertisement into the synthesized, advertisement-based, video stream for transmission to an end-user device via which to display the synthesized, advertisement-based, video stream. The embodiment then transmits at step 135 the synthesized, advertisement-based, video stream to an end-user device.

Hereinafter, a digital image or video stream may be referred to simply as a video stream, with the understanding that a reference to "a video stream" or "the video stream" is meant to include a digital image or a video stream, as the case may be. Likewise, digital images or video streams, or a plurality of digital images or video streams, may be referred to simply as video streams or a plurality of video streams with the understanding that the reference is meant to include digital images or video streams.

A source for one or more of the above mentioned video streams includes cameras (either a 2D or a 3D camera), or live camera video streams or a pre-processed version of the live camera video streams (the aforementioned pre-processing may be a simple foreground extraction of a video conference participant, or it could be a more complex set of extractions, e.g., multiple persons), pre-recorded video streams or a derivative thereof, still digital images, and 3D models of objects (which could be either based on camera images or CGI).

The embodiment 100A may include receiving at step 105 multiple video streams each essentially consisting of a representative image of a person. Likewise, embodiment 100A may include receiving at step 105 multiple video streams each essentially consisting of representative images of one or more persons. For example, one video stream may include a representative image of one person, and another video stream may include representative images of two or more people.

The embodiment 100A may also include receiving at step 105 multiple video streams each comprising a place, in which case, embodiment 100A selects at step 120 which video stream comprising a place to combine at step 130 with the video streams each essentially consisting of the representative image of a person with the video stream comprising the advertisement into the synthesized, advertisement-based, video stream for transmission to an end-user device.

Similarly, embodiment 100A may also include receiving at step 105 multiple video streams each comprising an advertisement, in which case, embodiment 100A selects at step 125 which video stream comprising an advertisement to combine at step 130 with the video streams each essentially consisting of a representative image of a person with the video stream comprising the place into the synthesized, advertisement-based, video stream for transmission to an end-user device.

With reference to FIG. 2A, one embodiment 200A, which can be combined with the other embodiments 100A, 101B, 102C, 103D, 104E, 100F, 101G, 102H, 103I and 104J, selects at step 205 a location within a selected video stream comprising the place in which to display a selected video stream comprising the advertisement. For example, if the video stream comprising the place is a video stream of a meeting conference room, there may be multiple acceptable locations in the meeting conference room in which to display an advertisement. For example, a video stream of a meeting conference room may have a blank wall in the background, and there may be multiple locations on the blank wall on which to display an advertisement. One or more locations could each be identified as, and selected by, an array of pixel coordinates. The embodiment 200A then combines at step 225 one or more video streams each essentially consisting of the representative image of the person with the selected video stream comprising the place and with the selected video stream comprising the advertisement displayed at the selected location within the selected video stream comprising the place.

Embodiment 200A may first normalize at step 210 the selected video stream comprising the advertisement for display at the selected location within the selected video stream comprising the place, and then combine at step 225 the one or more video streams each essentially consisting of the representative image of the person with the selected video stream comprising the place and with the selected and normalized video stream comprising the advertisement displayed at the selected location within the selected video stream comprising the place.

Normalization entails sizing the video stream of an advertisement so that, at the least, it fits within a selected location in the video stream comprising the place. The object of doing so is to make the video stream of the advertisement appear realistic—as if the advertisement itself was actually present in the place, not just a video stream of an image of the advertisement combined with a video stream of a place, essentially superimposed, at a selected location in the video stream of the place. Normalization can also apply to other characteristics of the video stream of an advertisement, including matching, or at least closing a gap between the contrast, brightness, hue, etc., of the video stream of an advertisement with the contrast, brightness, hue, etc., of the video stream of a place.

In a similar manner, embodiment 200A may select at step 215 one or more locations within the selected video stream comprising the place in which to display the one or more video streams each essentially consisting of the representative image of the person. The embodiment 200A then combines at step 225 the selected video stream comprising the place with the one or more video streams each essentially consisting of the representative image of the person displayed at the selected one more locations within the selected video stream comprising the place and with the selected video stream comprising the advertisement.

Embodiment 200A may first normalize at step 220 the one or more video streams each essentially consisting of the representative person for display at the selected one or more locations within the selected video stream comprising the place, and then combine at step 225 the selected video stream comprising the place with the normalized one or more video streams each essentially consisting of the representative image of the person displayed at the selected one or more of the locations within the selected video stream comprising the place and with the selected video stream comprising the advertisement.

The embodiments described herein refer to a step of receiving one or more video streams each essentially consisting of the representative image of the person, such as step 105 in embodiment 100A. Such embodiments may first involve receiving one or more digital images or video streams ("video streams") each comprising one or more persons, extracting from each of the received video streams, a portion of the video stream that essentially consists of a representative image of the person, and producing therefrom the one or more video streams each essentially consisting of the representative image of the person. For example, a video stream of a person may include the whole of the person, as well as space around the person, or perhaps an image or video of the upper torso and head of the person, whereas the extracted portion of the video stream of the person may include just the neck and head, just the head, just the torso, or even just one or more extremities, of the person—whatever is appropriate in the context to provide a representative image of the person. The concept here is to obtain a sufficient portion of an image of a person to complete the scene once the extracted portion of the image of the person is combined with the video streams of the place and one or more advertisements. If the digital image of a person is incomplete and is therefore insufficient for a particular video conferencing application then, according to one embodiment, CGI can supply the missing portions by 3D modelling and then rendering a 2D video stream essentially consisting of a representative image of a person from appropriate camera angle. In one embodiment, the selected video stream of the place with which the one or more video streams each essentially consisting of the representative image of the person is combined informs the extracting, from each of the received video streams, the portion of the video stream that essentially consists of a representative image of the person to produce therefrom the one or more video streams each essentially consisting of the representative image of the person. In one embodiment, the location selected within the selected image or video stream of the place in which to display the one or more video streams each essentially consisting of the representative image of the person may also inform the extracting, from each of the received video streams, the portion of the video stream that essentially consists of a representative image of the person to produce therefrom the one or more video streams each essentially consisting of the representative image of the person.

Likewise, in one embodiment, the selected video stream of the advertisement with which the one or more video streams each essentially consisting of the representative image of the person is combined informs the extracting, from each of the received video streams, the portion of the digital image or video stream that essentially consists of a representative image of the person to produce therefrom the one or more video streams each essentially consisting of the representative image of the person. In one embodiment, the location selected within the selected image or video stream of the place in which to display the advertisement may also inform the extracting, from each of the received video streams, the portion of the video stream that essentially consists of a representative image of the person to produce therefrom the one or more video streams each essentially consisting of the representative image of the person.

Referring again to FIG. 1A, embodiment 100A may include receiving input at step 110, for example, machine or user input, for selecting the video stream comprising the place. In such an embodiment, selecting at step 120 the video stream comprising the place involves selecting the video stream comprising the place, based on the input received at step 110. In a similar manner, embodiment 100A may include receiving input at step 115 for selecting the video stream comprising the advertisement, in which case, selecting at step 125 the video stream comprising the advertisement involves selecting the video stream comprising the advertisement, based on the input received at step 115.

Figure 1B:
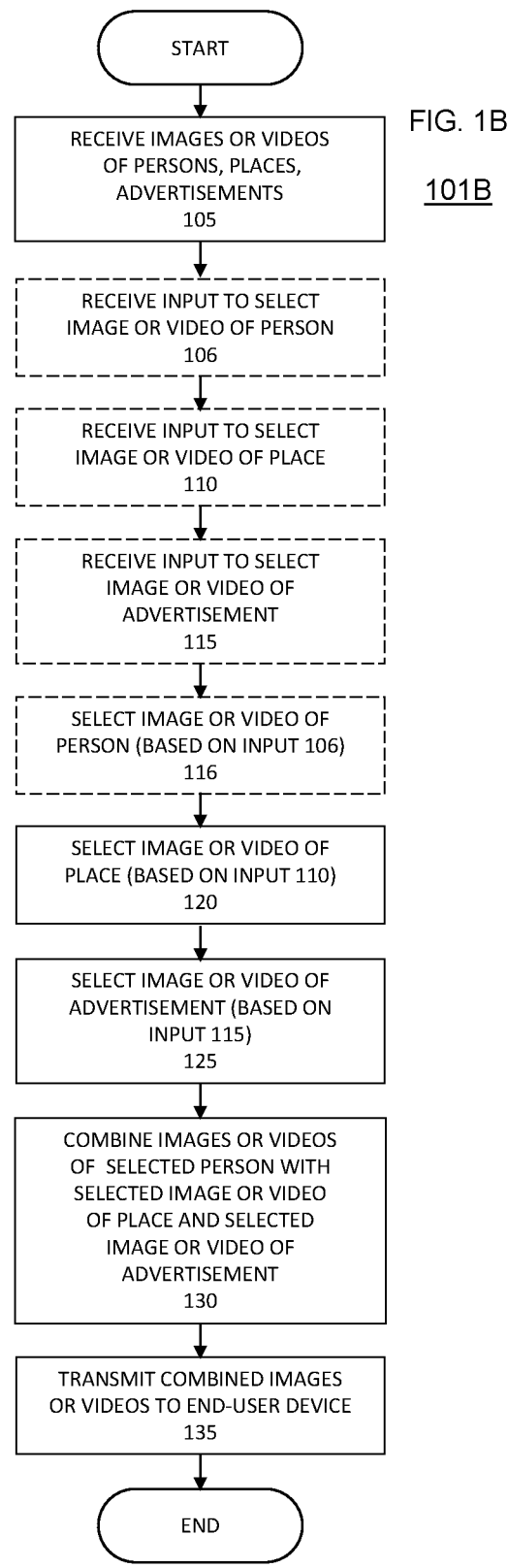
FIG. 1B is a flowchart of a method in accordance with an embodiment of the invention.

The embodiment 100A described above with reference to FIG. 1A contemplates receiving at step 105 one or more video streams essentially consisting of a representative image of one or more persons, a separate video stream comprising a place, and a third video stream comprising an advertisement, and then combining at step 130 the received one or more video streams essentially consisting of the representative image of one or more persons with the video stream comprising the place and with the video stream comprising the advertisement into the synthesized, advertisement-based, video stream for transmission to an end-user device via which to display the synthesized, advertisement-based, video stream. With reference to FIG. 1B, the embodiment 101B, in contrast, contemplates receiving at step 105 one or more video streams essentially consisting of a representative image of one or more persons, just as in step 105 of embodiment 100A. However, this embodiment involves then selecting at step 116 which of the received one or more video streams essentially consisting of a representative image of one or more persons to later combine at step 130 with the video stream comprising a place, and the video stream comprising an advertisement. Embodiment 101B may further include receiving input at step 106, for example, machine or user input, to use in selecting at step 116 which of the received one or more video streams essentially consisting of a representative image of one or more persons to later combine at step 130 with the selected video stream comprising a place, and the selected video stream comprising an advertisement.

Embodiment 101B may include receiving machine or user input, or a combination thereof, at step 106 for selecting which of the received one or more video streams essentially consisting of a representative image of one or more persons, in which case, selecting at step 116 the received one or more video streams essentially consisting of a representative image of one or more persons involves selecting the received one or more video streams essentially consisting of a representative image of one or more persons, based on the input received at step 106. User input may be provided by a host, participant, or person, that is to participate in, or to view, or viewing the synthesized, advertisement-based, video stream, or an administrator of, or service provider for, a video conferencing system or service that hosts the synthesized, advertisement-based, video stream, or an advertiser or representative for a company that provides advertising content for display in the synthesized, advertisement-based, video stream. For example, a person that is the host for a video conference, during set up and scheduling of an upcoming video conference, or on-the-fly during a video conference, for example, when setting up a side bar video conference meeting between a subset of video conference participants, may select the received one or more video streams essentially consisting of a representative image of one or more persons. Machine input may be provided by a video conferencing system. The machine input may rely on data, whether historical data, user data, user feedback, data gathered from previous video streams transmitted to the, or to other, end user devices, to inform selection of, or to select, the received one or more video streams essentially consisting of a representative image of one or more persons. For example, the machine input may select the received one or more video streams essentially consisting of a representative image of one or more persons, based on the one or more persons that accepted an invitation, or that are authorized, to participate in a video conference, or based on gathered and analyzed data associated with the one or more persons.

One of the advantages of the above described embodiment is that it provides support for multiple synthesized, advertisement-based, video streams, with a different set of people selected for each synthesized, advertisement-based, video stream. For example, if four video streams of persons are received at step 105, two of the video streams may be selected at step 116 for combination with a selected video stream of a place and with a selected video stream of an advertisement, and transmitted in a first synthesized, advertisement-based, video stream, whereas the other two video streams of persons may be selected at step 116 for combination with the selected video stream of a place and with the selected video stream of an advertisement, and transmitted in a second, separate, synthesized, advertisement-based, video stream. It is further appreciated that a video stream of a different place and/or a video stream of a different advertisement, may be selected for the second, separate, synthesized, advertisement-based, video stream compared to the first synthesized, advertisement-based, video stream. In this manner, each synthesized, advertisement-based, video stream may have its own distinct place and one or more advertisements. This is particularly useful, for example, when targeting advertisements to one set of video conference viewers or participants versus another set of video conference viewers or participants, and is also helpful when dividing a synthesized, advertisement-based, video stream into separate synthesized, advertisement-based, video streams, for example, when conducting break-out sessions or side-bar discussions for different groups of participants or viewers.

With reference to FIG. 1C, one embodiment of the invention 102C obtains at step 107 data associated with a person, a representative image of which is included in the received one or more video streams each essentially consisting of a representative image of a person. In such an embodiment, selecting the video stream comprising the advertisement involves at step 126 selecting the video stream comprising the advertisement based on the obtained data associated with the person. The obtained data associated with the person may be, for example, information or data obtained from the person's one or more social media accounts, contact information provided to the video conference system, data regarding the person's professional, financial, or personal life obtained from public records, or private records the person authorizes or agrees to provide access to for such use. Additionally, the selection of the advertisement may be based on input received at optional step 115 to select the video stream of a particular advertisement.

Similarly, with reference to FIG. 1D, one embodiment of the invention 103D obtains at step 108 data associated with a person (not a video conference participant) that is to view, or is viewing, the synthesized, advertisement-based, video stream transmitted to an end-user device, in which case, selecting the video stream comprising the advertisement involves selecting at step 127 the video stream comprising the advertisement based on the obtained data associated with the person. Additionally, the selection of the advertisement may be based on input received at optional step 115 to select the video stream of a particular advertisement.

Figure 1E:
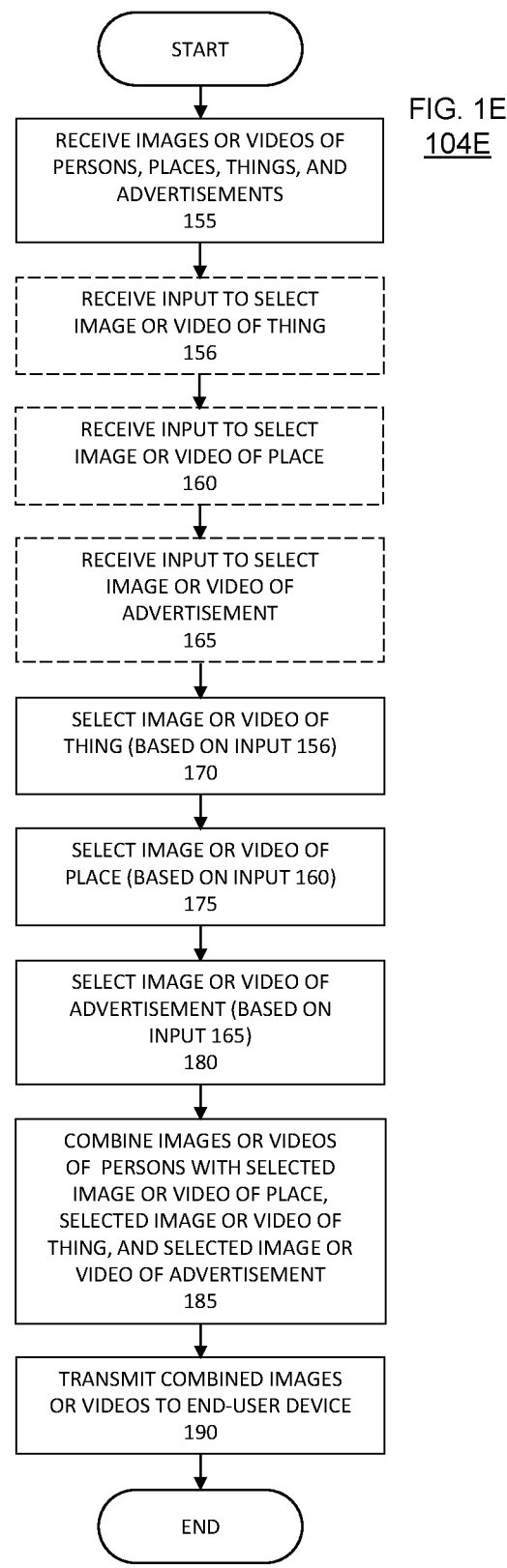
FIG. 1E is a flowchart of a method in accordance with an embodiment of the invention.

With reference to FIG. 1E, an embodiment of the invention 104E involves at step 155 receiving not only video streams of images of persons, a place, and advertisements, but also receiving one or more video streams each comprising an image of a thing, for example, an image of an object that may be combined with the images of one or more persons, a place, and one or more advertisements, in the synthesized, advertisement based, video stream transmitted to an end-user device. In one embodiment, a video stream of an image of an object could appear to be what is essentially a set piece on a stage or set, for example, furniture such as a desk, table, or bookcase positioned within, or a picture on a paneled wall in, a virtual library. Additionally or alternatively the image of the object may be an image of an advertisement, for example, an image of a can of a branded beverage, which may be a primary or at least an intended purpose of integrating the image of the object into the synthesized, advertisement-based, video stream transmitted to an end-user device, according to an embodiment. Just as an image of an advertisement may be located within an image of a place according to the described embodiments, the location of the image of the thing may also be located within the image of the place in the same manner.

Embodiment 104E selects at step 170 a video stream of a thing, which may be based on input obtained at step 156 to select the video stream of the thing. Embodiment 104E then selects at step 175 a video stream of a place, which may be based on input obtained at step 160 to select the video stream of the place. Step 180 then selects one or more video streams of advertisements, which may be based on input obtained at step 165 to select the one or more video streams of advertisements. The embodiment then combines at step 185 the one or more video streams each essentially consisting of the representative image of the person with the selected video stream comprising the place, with the selected one or more video streams each comprising the thing, and with the selected video streams comprising the one or more advertisements into the synthesized, advertisement-based, video stream for transmission at step 190 to an end-user device via which to display the synthesized, advertisement-based, video stream.

According to embodiments, an image of a thing may be static or dynamic, that is, the video stream of the image of the thing may be static—e.g., a video stream of an image of a table, or the video stream of the image of the thing may be dynamic—e.g., where the image of the place is an outdoor location (e.g., a sidewalk café), a video stream of an image of a person walking through a background location in the image of the outdoor location (e.g., the sidewalk). References herein to an image of an event refer to a video stream of an image of a dynamic thing, as discussed above. An event may also be referred to as event content. An event may be 2D or 3D.

According to one embodiment, a stage or set may include images of certain of the elements (place, advertisements) to display in the synthesized, advertisement-based, video stream, according to embodiments of the invention, but not the video streams each essentially consisting of a representative image of a person. A set is analogous to the stage and its props for a theatrical production, and may include objects located in the background, mid-ground and foreground locations of the stage. According to an embodiment, a set includes a room and its framing (e.g., walls, floor, ceiling), locations within the room for video streams of advertisements and/or things (including events), and, optionally, the video streams of advertisements and/or things (including dynamic things, i.e., events). According to the embodiments, a set may be two-dimensional (2D) or three-dimensional (3D).

An embodiment may make use of a baseline set, which is used as a starting point for building the complete set. The content for the baseline set, and all associated metadata, is stored in a database accessible to the video conferencing system, such as place/things database 441 described below with reference to FIG. 4. The metadata may include references to other databases that include content to retrieve when rendering a video stream of the set. For example, the metadata may include links or references to images of advertisements in an advertising database, such as advertising database 442. The metadata may also provide templates for the placement of advertisements, as well as criteria for limiting or restricting the use of certain places and/or advertisements. For example, "use" criteria for a baseline set created for one coffee shop or café chain would limit the use of certain places and/or advertisements created for that coffee shop or café chain and prohibit its use for other, competitive, coffee shops or café chains. According to an embodiment, a baseline set may: (1) start with a shell, for example just images of one or more walls, the floor, and the ceiling of a room, or (2) it may be fully populated with images of events and advertisements. An example of the fully populated set with advertisements is a set sponsored by an international chain of coffee shops, wherein the image of the room, including the walls, floor and ceiling, and furniture, images of things such as art work on the walls, etc., are selected and configured to achieve the look and feel for which the chain is recognized. The set might further include images of objects, such as the chain's branded coffee cups, and advertising in the form of images of the chain's trademarked brand prominently or conspicuously located within the image of the room. Sets may be dynamic in that some of the events in a set may move or change over the duration of the display of the synthesized, advertisement-based, video stream. A set may also include events with audio content, according to embodiments.

Following are examples of event content and associated metadata:

Example #1: Picture with Frame

Animation type: static.
Description: object: Picture with a frame.
3D models: Scalable with aspect ratio of 3 feet high, 3 feet wide. Depth: 0.15 feet also scalable but with a 0.5 scale rate.
Placement: back wall.

Example #2: Conference Room Table

Animation type: static.
Description: object: conference room table.
3D models: Unscaled model: 8 feet long, 2.5 feet high, 2.5 feet deep.
Placement: floor.

Example #3: Beverage Located on Horizontal Surface (e.g. Conference Room Table)

Animation type: static.
Description: object: Beverage on table top: glass partially filled with clear liquid.
3D models: Unscaled model: cylindrical clear glass 2.5 inches in diameter, 6.5 inches tall, ¾ full of clear fluid (water or alcohol).
Placement: top of conference room table.

Example #4: Transparent Back Wall with Activity in Corridor Behind Transparency

Animation type: dynamic.
Description: people traffic in corridor visible through transparent back wall of a conference room. People traffic appears natural and non-repetitive. People traffic is bidirectional in corridor. Includes hallway meetings between people travelling through length of corridor.

Example #5: Large Window on Back Wall with Activity Behind Transparency

Animation type: dynamic.
Description: people traffic on the sidewalk and vehicle traffic in an outdoor scene as seen through a large window in the conference room located on the ground floor. In corridor visible through transparent back wall of conference room. People traffic and vehicle traffic appears natural and non-repetitive. People traffic and vehicle traffic is bidirectional in corridor. Includes short term parking for vehicle.

Set construction, whether involving user or machine input, for example, based on the type of meeting or the persons invited, the topic of the meeting, etc., according some embodiments, is described as follows. A completed set consists of all the elements that are required for the video synthesis module 433, with the exception of the participants, which may be real or virtual. The place/things database 441 can provide various levels of starting points and the completion of the set accomplished incrementally by adding content until the set is completed. Consider the following two examples:

Example 1: Full Custom Set step 1: Starting point is a baseline set with only walls, floor, ceiling;
step 2: Select objects/things, e.g., furniture, piece by piece: table, chairs, cabinets, coat racks;
step 3: Select windows and doors piece by piece;
step 4: select wall pictures, wall clock;
step 5: Select options for dynamic traffic through transparent backgrounds, whether a window or wall(s) that is transparent.

Example 2: Semi-Custom Set step 1: Starting point is a baseline set with walls, floor, ceiling that comes with furniture and windows and doors and a clock;
step 2: select wall pictures;
step 3: Select options for dynamic traffic through transparent backgrounds, whether window or transparent walls.

Example 3: Select One of a Plurality of Completed Sets from Database

According to some embodiments, elements in the database of place/things have attributes associated with them, and a user interface allows a host or administrator select attributes, and elements are offered from which to select to include in set based on the value of the attributes. Examples of place/things database attributes and corresponding values follow:
attribute=completeness; value=shell only (walls and floor), partial, complete
extensive list of permutations
attribute=business/social type
if business then
formal
board meeting
design review
product dev weekly meeting
casual
if social then
event driven
b-day
anniversary
Number of participants: correlates to layout style
attribute=sizes
correlates to number of participants and layout style
layout style
one shared room, a podium with stage (i.e., auditorium style) seating, individual rooms for each participant
attribute=3D/2D According to embodiments of the invention that provide for building a set through inserting event content into the set enables the realization of a new advertisement platform. Consider that inserting event content into a set provides a means for advertising products, services, activities and so on, for profit or not for profit. Consider the following examples.

Event insertion example #1 described above may be transformed to an advertisement if the picture of fruit and wine is replaced by a picture of a make and model of a sports car. Event insertion example #3 described above may provide advertisement if the glass of water is replaced with a branded can of soda. Event insertion example #5 described above regarding a large exterior window through which vehicle traffic may be visible may be an advertisement in which a truck with branded logo parks just outside the window. Moreover, banner ads may run continuously focused on the interests and activities of a participant. Sports scores, sales on hobby related activities, coupons for dinner etc., may be displayed.

According to embodiments of the invention, there are various selection processes, such as selection of baseline set, selection of event content that transforms the baseline set into a completed set, and the selection of advertising content. Set selection may be based on stakeholder input, for example, from an advertiser, or from a video conference system subscriber or user, or meeting host, and can further be informed by history/analytic feedback. Event content selection may be based on the same criteria for set selection, but in addition the event content may be coordinated with the set selection and the other events selected. Advertisement content selection may be based on the same criteria as event content, and may be weighted by the advertiser or advertiser's guidelines.

According to embodiments, input from stakeholders affects and narrows the scope of permissible content (sets, events, advertisements), and/or may be used to create a smaller candidate list or screened list. For example, the input may involve selecting from one of the screened possibilities in a first iteration, then measure feedback over a sample of n meetings before adjusting selection in a second iteration. Feedback may be measured over a sample of j meetings, and content adjusted accordingly to reach optimal performance. Choices may be ranked based historical feedback. A closed loop feedback allows "local" optimization of the search. Optimization is local in the sense that the searchable attributes are varied within a range around the initial starting point. Optimization is local because the optimal response from one starting point may be different than the optimization from a second starting point.

According to one embodiment of video synthesis, choice of baseline set is a pre-recorded background image or video of a completed set. In such an embodiment, there is no need to insert any events since all elements of the set are, by definition, included in the pre-recorded set. Advertisement content is placed in the background. There is no requirement on normalization or placement considerations relative to objects in the background. However advertisement content should not significantly impede the view of the participants. Extracted participant streams are placed in the foreground of the composite video, with no requirements on normalization. The participant video stream is placed in a location that does not significantly impede the view of the advertisements. This a simple method to implement because: 1) it uses only 2D video streams, 2) does not require normalization, 3) the only placement requirement is that the participant and advertisement placements should not mutually interfere with each other to any significant degree.

According to a second embodiment of video synthesis method, the choice of baseline set is a pre-recorded background video or image of a set with the following limitations: the set is not required to be complete, i.e., some of the elements of the set may be completed via event insertion; and the baseline set is filmed from a camera that is at a predetermined location and angle, with specified settings, dimensions of the walls and floors are specified. Event content is placed in locations that are determined by the input information (previously described) and historical feedback data (previously described). Events are filmed from a camera that is at predetermined location and angle, with specified settings. Therefore, all event content is oriented in the same perspective in order to make the synthesized video stream more realistic. According to this embodiment, normalization is beneficial. Advertisement content is placed according to the same criteria for situating event content. Extracted participant video streams are located in the foreground of the composite video, using normalization to size participant images even if a participant changes his or her distance from their respective camera. The extracted participant streams are situated behind a foreground object, such as a desk, in the synthesized video stream which disguises the fact that the participant image information is not complete, e.g., the video stream does not capture a part of body (i.e., the lower part of the participant's body). Participants may be placed at predetermined locations. This embodiment offers advantages over the other embodiments for video synthesis, including a significant improvement over the first described embodiment because the normalization and placement algorithms make the synthesized video stream appear more realistic. However this embodiment does not involve the more significant computing infrastructure of the next embodiment described below.

According to a third embodiment of video synthesis method, the choice of the baseline set is based on sets represented in a 3D model. The baseline set may not be complete and as such may require the insertion of events. In 3D modeling all objects and persons are represented by their own digital 3D model that details their geometry in an xyz coordinate system. The mechanics of 3D modeling construction and associated 2D renderings is accomplished with packages such as Adobe Photoshop CC, or Adobe After Effects. One way to create 3D models of the set is to use 3D camera systems, for example the 3D systems available from Matterport or Faro. These same systems may also be used to create 3D models of the additional objects and persons to be inserted into the set. Another way to create a 3D model is by taking multiple pictures of all the surfaces of the object in question and import those pictures into a software program like Autodesk's 123D Catch. According to this embodiment, event content is situated in locations that are determined by the input information (previously described) and historical feedback data (previously described). Events placement is straightforward: place the object(s) at the location determined in the virtual 3D space. Size normalization is not required since the virtual camera renders 2D perspective images with all objects in view in the appropriate size and perspective. Advertisement content is placed according to the same requirements as event content. Extracted participant streams are converted to 3D models based on live camera input and images of participant from previous sessions. The participant 3D models are placed in the designated locations, e.g. seated behind a conference room table. Once objects are inserted into the 3D set environment they are placed in proper locations, again using a process similar to placing objects in their proper locations on a stage. To make the assembled set appear more realistic, surface texture and colors may be added to the surfaces as well as the desired lighting. Shadows from the lighting may also be created. Finally, a 2D perspective image of the 3D model is generated by a virtual camera. The virtual camera is placed at a selected location and angle to render the desired view of the digital 3D scene. According to one embodiment, pre-rendering is performed for all deterministic parts of the set to reduce the amount of processing power needed to render the synthesized stream in real time. However, it is possible to perform these steps in real time with minimal latency as is done in the gaming industry.

A fourth embodiment of the video synthesis method is essentially a hybrid of the second and third embodiments discussed above. One of the limitations of the second embodiment is that event and advertisement insertion into planes that are not perpendicular to the camera lens central axis are strongly affected by the perspective transformation, i.e., objects close to the camera appear larger than objects that are farther away. Note that the backwall of a conference room is roughly equidistant from the camera and therefore in most cases orthogonal projections can be used in this case, i.e., no perspective transformation may be necessary. However for some cases it may be necessary to render 2D perspective image/stream based on a 3D model.

For objects with surfaces visible to the camera that are not perpendicular to the camera lens central axis, consider the case of the surface of a conference room table in front of the video conference participants. The plane of the surface of the table may not be perpendicular to the camera lens central axis. Further suppose that an image of a can of soda is to be placed on top of the table' surface. One option is to use a 3D model of the table and render a 2D perspective of the table using a virtual camera that has the same position, angle, etc., as the real camera. This rendering may then be used as layer 3 in a digital composite layer stack, as described herein.

For live camera extracted participant video streams, the camera conditions (position, distance, angle, focal length, aperture, etc.) are generally not the same as the camera conditions used for the set (background) or for the foreground in the synthesized, ad-based, video stream. Indeed, the camera conditions may vary for each participant. One method for resolving this issue is to first create a 3D model of each participant (based on both live camera extracted images, and from previously recorded images/streams of the participant). Once the 3D model is created a 2D perspective image of the participant(s) is rendered with a virtual camera with the same camera conditions as the camera conditions used for the other elements in the background and foreground of the synthesized video stream. This approach allows embodiments to use non-stationary video camera sources, e.g., cameras in smartphones, to achieve a presence in a meeting without the distortion that would normally occur with a moving camera. The rendering is then assigned to the appropriate layer in the composite layer stack, as described herein.

As discussed above, embodiments provides feedback that influence the selection process for sets, advertisement, and events. Using feedback allows embodiments to adjust over time to improve performance, whether in terms of meeting effectiveness and/or advertisement effectiveness. In one embodiment the feedback, obtained from an analytics/history database, such as analytics/history database 444, effects both the controller 430 which controls both the content selection module 432 and the video synthesis module 433, and also effects the input content, including advertisement content and user or administrator input. For example, as advertisers see that certain types of advertisements are more effective than other types of advertisements, they will generate more appropriate or directed advertisements either directly or through third parties.

According to embodiments, there are two types of analytics: how effective was the meeting—how many people showed up, how many people stayed on, how many people actively participated, and for a social meeting, how many new connections generated; and how effective was the meeting from an advertisement perspective—what was the number and frequency of different levels of interaction, in terms of glances, click thru's, or purchases.

According to embodiments, history files may be generated, for each stakeholder, to assist in determining effectivity, e.g., of advertisements, in terms of eye tracking or other interactions. According to embodiments, analytics may be used by each of the meeting stakeholders. Feedback via a history file may be used to alter the selection and video synthesis processes described herein. For example, an advertiser may want to know what kind of advertisements are more effective. The advertiser may decide to test run three scenarios, and gather data on many meetings for each scenario. The results of those many meetings may yield data that favors one scenario over the over two which in turn would affect future advertisement campaigns.

Embodiments of the invention contemplate various levels of interaction with advertisements. According to one embodiment, the interaction involves visual interaction. For example, each participant may interact with individual advertisements in variety of ways. One such instance is a visual interaction such as branded can of soda placed on a table as a product placement. The branded can of soda naturally blends in with the environment (i.e., a conference room set), where the participant is viewing the branded product knowingly or unknowingly. There may be no intentional action taken by the participant and yet the participant would notice the brand of the product being present in the scene.

According to another embodiment, the interaction involves establishing eye contact via eye tracking technology. This embodiment passively interacts with advertising events through eye tracking, where a participant is not required to take any action. In such an embodiment, a virtual camera that is used to extract the foreground of the participant is integrated with existing eye-tracking technologies to track the movement of the eyes of the participant. Other embodiments may use external cameras to increase the accuracy and precision of the eye tracking, such as infra-red cameras available from Tobii AB, of Sweden. In such an integration, object recognition algorithms are used to identify the eyes of the participant and then track the movement of the eyes to correlate that movement to a particular location within the screen in front of the participant. Some algorithms require the participant to perform a calibration exercise which may increase the accuracy and granularity of the detection and the resulting correlation of the eye movement to the location on the screen. As this technology evolves the accuracy of the eye tracking will improve and the need to calibrate will be reduced or removed entirely.

For example, consider that the video conferencing is presented on an entire display screen (Full Screen mode) of an end user device. The correlation accuracy, which may be defined as the accuracy of predicting where the participant is looking, is typically dependent on the ability of the eye tracking algorithm to detect eye-movement. Suppose that the display screen is divided into a matrix of smaller 'focus' areas. The smaller the 'focus' area, the greater will be the granularity of data. Once the movement of the eyes is correlated to these 'focus' areas identifying the position on the display screen where the participant was looking, embodiments can then calculate which part of the screen and how much time did the participant spend looking at that part of the screen.

Once the data (approximate section of the screen at which the participant looked) is available, it can be correlated with the placement of the advertised brand/product or video. Embodiments can then identify with sufficient accuracy whether the participant was looking at the advertised product or not. In addition, embodiments may also calculate the amount of time the participant looked at the advertised product. Embodiments may choose to either report the data or analytics (based on the characteristics of the data) back to the advertiser (in terms of amount of time the participant spent in looking at their product), indicating a possible interest in the product. This may also translate to brand awareness. According to an alternative embodiment for eye tracking systems that use cameras currently available in today's laptops, and mobile devices, eye tracking may be accomplished with an accuracy to within approximately 5 degrees, depending on factors such as but not limited to a person's eye anatomy, the lighting in the room the person occupies, the tilt of the person's head, and the resolution of the camera. According to this embodiment, a large number of virtual meetings without advertising are conducted and another large number of virtual meetings are conducted with advertisements. The embodiment can then compare the distribution of persons' gazes and ascertain if the gaze deviation caused by advertisements is greater than the statistical variance of the measurement.

According to another embodiment for advertisement interaction, a pop-up window may be initiated by eye contact. This embodiment takes a positive action on the part of the participant and initiates a pop-up window on the end user device's display screen asking the participant to confirm their interest in the product or brand. The embodiment may alternatively present promotional offers to the participant by providing a re-direct link in a web browser that allows the participant to click on (i.e., select) to make a direct purchase. Many such actions are possible once the participant's' 'stare analytics' data is available.

According to yet another embodiment for advertisement interaction, a direct click-through is captured for a participant. This embodiment allows for interacting with advertisements embedded within a video stream via a direct click-through of a particular area of the video stream which displays the advertisement. This embodiment may choose to engage in a variety of responses including but not limited to a re-direct link, opening up a new webpage, or an application, or prompting the participant to fill out a survey and other such possibilities.

The embodiments described above may be repeatedly or iteratively performed, either within the context of an on-going or real-time transmission of the synthesized, advertisement-based, video stream to an end-user device, or within the context of a series of synthesized, advertisement-based, video streams transmitted to an end-user device over time. In any case, data, whether historical data, user data, user feedback data, or data gathered from previous video streams transmitted to the, or to other, end user devices, can be used to inform the current or subsequent synthesized, advertisement-based, video streams transmitted to an end-user device, according to an embodiment of the invention. With reference to FIG. 3, such an embodiment 300 involves transmitting at step 305 the synthesized, advertisement-based, video stream to the end-user device via which to display the synthesized, advertisement-based, video stream. The embodiment then receives at step 310 data regarding the synthesized, advertisement-based, video stream transmitted to the end-user device, and selects, at step 315, from the video streams of advertisements received at step 305, one or more video streams each comprising a new advertisement, based on the received data. The embodiment combines at step 320 the video streams each essentially consisting of the representative image of the person with the selected video stream comprising the place and with the selected digital image(s) or video stream(s) comprising the new advertisement(s) into a subsequent synthesized, advertisement-based, video stream for transmission to an end-user device via which to display the subsequent synthesized, advertisement-based, video stream.

Further embodiments of the invention involve a method for providing advertising to a video conference participant participating in a video conference stream. With reference to FIG. 1A, the embodiment involves receiving at step 105 a video stream of an image of a person who is a video conference participant, and extracting a representative portion of the image of the video conference participant from the digital image or video stream of the video conference participant. The embodiment further receives at step 110 a video stream of a place, e.g., an image of a conference room, and at step 115 a video stream of an advertisement. The embodiment combines the elements at step 130 into a synthesized, advertising-based, video conference stream, wherein the representative portion of the image of the video conference participant is combined with the video stream of the place and with the video stream of the advertisement in such a manner as to display the representative portion of the image of the video conference participant in one location of the video stream of the place (e.g., in a foreground location), and to display the video stream of the advertisement in a second location of the video stream of the place (e.g., a background location). The embodiment then transmits at step 135 the synthesized, advertising-based, video conference stream to an end-user device for display to the video conference participant.

It is appreciated that the embodiment may involve providing advertising to a number of video conference participants participating in a video conference stream. Such an embodiment receives a number of video streams of images of video conference participants, extracts a representative portion of the image of each of the video conference participants from the number of received video streams of images of the video conference participants, receives one or more video streams of places, and receives one or more video streams of advertisements. The embodiment then selects one or more of the video streams of advertisements to display in one of the video streams of places, selects one of the video streams of the places in which to display the representative portions of each of the images of video conference participants, and in which to display the selected one or more of the video streams of advertisements. Next, the embodiment combines into a synthesized, advertising-based, video conference stream, the representative portions of each of the images of the video conference participants with the selected video stream of the place and with the selected one or more of the video streams of the advertisements in such a manner as to display the representative portions of each of the images of the video conference participants in one location of the selected video stream of the place, and to display the selected one or more of the video streams of the advertisements in different locations of the video stream of the place. The synthesized, advertising-based, video conference stream can then be transmitted to end-user devices for display to the video conference participants.

According to one embodiment, a different one or more virtual streams of advertisements are combined into the synthesized, advertising-based, video conference stream, along with the representative portions of the images of each of the video conference participants and with the selected video stream of the place, depending on the end-user device to which the synthesized, advertising-based, video conference stream is to be transmitted to end-user devices for display. For example, depending on the person or participant viewing the video conference stream transmitted, or to be transmitted, to a particular end-user device, an advertisement targeted to that particular person or participant may be selected, whereas a different advertisement targeted to a different person or participant may be selected.

Figure 4:
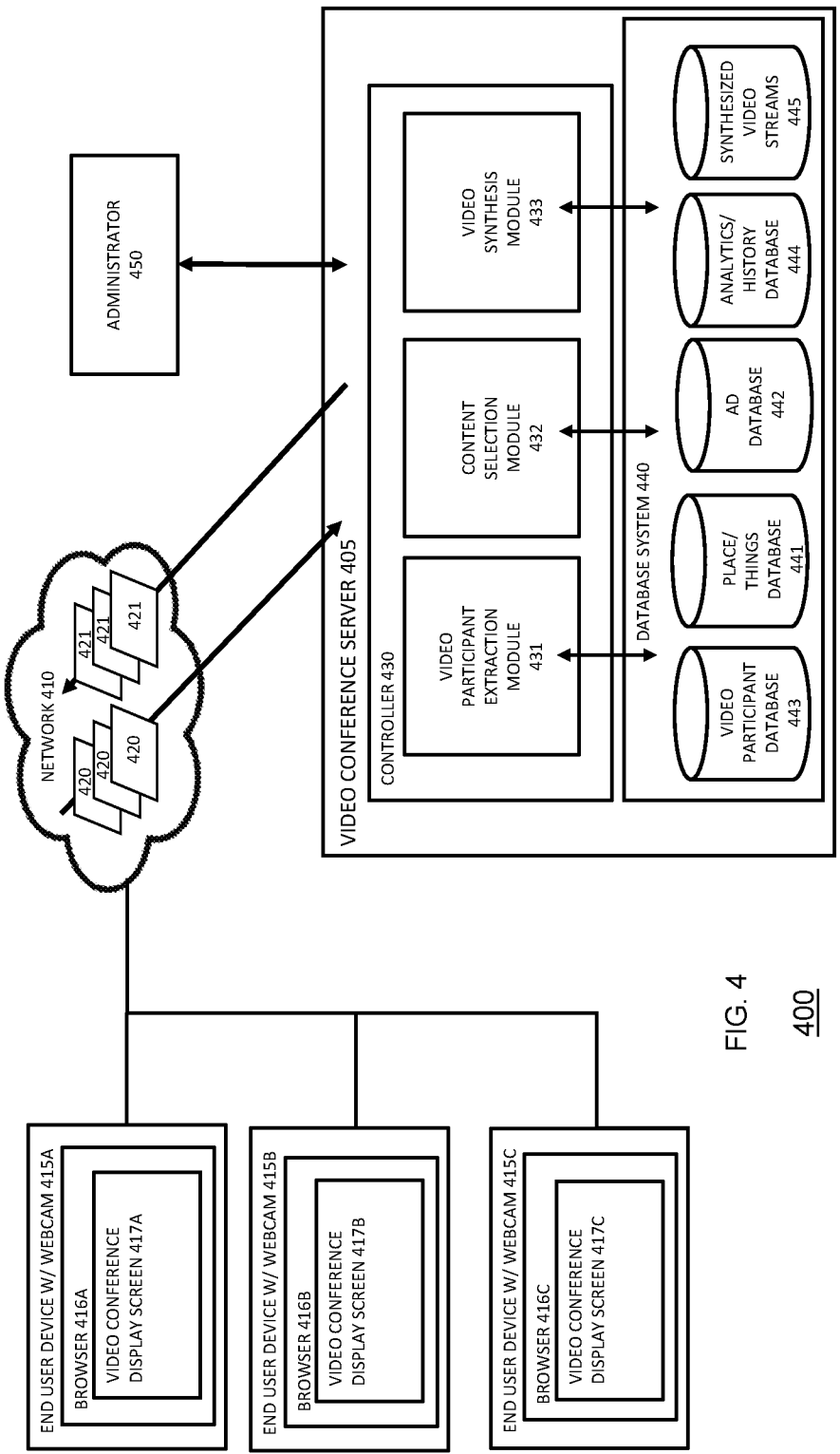
FIG. 4 is a functional block diagram in accordance with an embodiment of the invention.

A video conference system, according to embodiments of the invention 400, and a network architecture over which such embodiments may operate, is depicted in FIG. 4. Persons, for example, video conference participants (or simply "participants"), may operate respective end user devices, e.g., end-user devices 415A, 415B and 415C. For example, one or more video conference participants may run a respective web browser 416A, 416B, and 416C on their end user device to conduct a video conference between the participants, wherein the synthesized, advertisement-based, video streams 421 are transmitted from video conference server 405 over a network 410 to each of the end-user devices 415A, 415B, and 415C and displayed on respective video display screens 417A, 417B, and 417C.

Each end user device is equipped with or is otherwise coupled to a webcam that records a video stream of the one or more video conference participants, which is then transmitted as separate video streams 420 over network 410 to video conference server 405. The video streams 420 each comprise one or more persons or participants.

Upon receipt of the video streams at video conference server 405, a controller 430 directs a video participant extraction module 431 to extract, from each of the received video streams, a portion of the video stream that essentially consists of a representative image of the person, producing therefrom the one or more video streams each essentially consisting of the representative image of the person, e.g., the head, the head and torso, the torso, or an extremity, of the person. According to an alternative embodiment, video participant extraction may be performed on the end-user device. For example, video conference server 405, or the video participant extraction module 431 therein may coordinate with, and/or send instruction to, an end user-device 415 to perform local extraction at the end user device and transmit a video stream that essentially consists of a representative image of the person to the video conference server. Both the video streams 420 and the extracted portions of the video streams that essentially consist of a representative image of the persons may be stored in a video participant database 443 for later retrieval by any one of video participant extraction module 431, content selection module 432, or video synthesis module 433, depending on whether extraction or selection, or need occur, before synthesis, according to an embodiment. Controller 430 can communicate with and access database 443 as one of a number of databases 441, 442, 443 and 444 in database system 440, as further described herein. Contributors to the databases include advertisers that may directly contribute to the advertisement content in advertising database 442 for their products or the review and approval of the content created by third parties, or enterprise clients that may want to create place/things content, e.g., an image of a conference room, in places/things database 441, that establishes, promotes, or otherwise displays, their brand.

Alternatively, or additionally, video streams 420 and the extracted portions of the video streams that essentially consist of a representative image of the persons may be received at video conference server and directed by controller 430 to any one of video participant extraction module 431, content selection module 432, or video synthesis module 433 depending on whether extraction or selection occurs, or need occur, before synthesis, according to an embodiment.

Controller 430 directs video participant extraction module 431 to receive video streams essentially consisting of a representative images of persons, either directly from the streams 420 received from end-user devices 415A, 415B and 415C (e.g., real-time video streams), or from video participant database 443 (e.g., pre-recorded video streams). Controller 430 further controls video content selection module 432 to select a video stream comprising a place from place/things database 441. The database 441 stores pre-recorded video streams of various places, locations, and/or settings ("sets"). According to embodiments of the invention, video content selection module 432 selects a video stream comprising a place from place/things database 441 based on one or more factors, such as the one or more video streams of advertisements selected from advertising database 442, and the received video streams essentially consisting of the representative images of the persons/participants selected from video streams 420 and/or video streams obtained from video participant database 443.

Controller 430 also controls content selection module 432 to select a video stream comprising one or more advertisements from advertising database 442. The database 442 stores pre-recorded video streams of advertising content. Controller 430 then controls video synthesis module 433 to combine the received video streams essentially consisting of the representative images of the persons/participants with the selected video stream comprising the place and with the selected video stream comprising the one or more advertisements into the synthesized, advertisement-based, video stream 421 and transmit stream 421 to end-user devices 415A, 415B and 415C. The end-user devices display the synthesized, advertisement-based, video stream 421 in respective display screens 417A, 417B and 417C.

Additionally, according to one embodiment, the synthesized, advertisement-based, video stream 421 may be stored in a database for later retrieval and streaming. For example, a synthesized, advertisement-based, video stream may be stored in synthesized video streams database 445. In addition to the synthesized, advertisement-based, video stream being stored in synthesized video streams database 445, corresponding metadata regarding the synthesized, advertisement-based, video stream may be also be stored in synthesized video streams database 445. Thus, video conference server 405 can retrieve and re-stream the synthesized, advertisement-based, video stream either directly from the stored synthesized, advertisement-based, video stream retrieved from the synthesized video streams database 445, or recreate and re-stream the synthesized, advertisement-based, video stream from corresponding metadata retrieved from the database, or a combination thereof.

The ability to restream the synthesized, advertisement-based, video stream is particularly useful when retrieving a stored synthesized, advertisement-based, video stream from synthesized video streams database 445 for subsequent streaming, but first modifying one or more of the components of the synthesized, advertisement-based, video stream prior to the subsequent streaming. For example, one embodiment may involve modifying an existing one of the one or more of the video streams essentially consisting of the representative images of the persons/participants, or the selected video stream comprising the place, or the selected video stream comprising the one or more advertisements, before subsequently streaming the synthesized, advertisement-based, video stream. For example, an existing one of the one or more of the video streams essentially consisting of the representative images of the persons/participants may be modified, or removed, or the selected video stream comprising the place, or an object or event located therein, may be modified, or removed, or the selected video stream comprising the one or more advertisements may be modified, or removed, or a selected advertisement therein modified, or removed, and then the now modified, synthesized, advertisement-based, video stream is again streamed. Of course, this modified, synthesized, advertisement-based, video stream may also be stored in the synthesized video streams database 445, and may itself be later retrieved for streaming, with or without further modifications, and so on.

Likewise, one embodiment may involve changing or updating the synthesized, advertisement-based, video stream to include new video content, such as inserting a new video stream essentially consisting of a representative image of a new person or replacing an existing one more video streams essentially consisting of representative images of persons with a new video stream essentially consisting of a representative image of a new person, or replacing the video stream comprising the place with a new video stream comprising a place, or inserting a new video stream comprising the one or more advertisements or replacing an existing video stream comprising the one or more advertisements with a new video stream comprising the one or more advertisements, before subsequently streaming the updated synthesized, advertisement-based, video stream. For example, the synthesized, advertisement-based, video stream may be updated to include a different video stream comprising the place, or a different video stream of one or more advertisements. Likewise, this updated, synthesized, advertisement-based, video stream may also be stored in the synthesized video streams database 445, and may itself be later retrieved for streaming, with or without further updating, and so on.

According to the embodiments, a video content provider or service provider or advertiser provides input to select and thereby change video content in a stored synthesized, advertisement-based, video stream before the stored synthesized, advertisement-based, video stream is streamed again, in the same manner as described above with reference to the embodiments of the invention.

The corresponding metadata regarding the synthesized, advertisement-based, video stream stored in synthesized video streams database 445 may also, or alternatively, be utilized in modifying or updating the one or more of the components of the synthesized, advertisement-based, video stream prior to the subsequent streaming of the one or more components in the combined synthesized, advertisement-based, video stream. In particular, the metadata may be modified, for example, through user input, to include references to different or modified video streams essentially consisting of the representative images of the persons/participants located in video participant database 443, or a different or modified selected video stream comprising the place located in place/things database 441, or a different or modified selected video stream comprising the one or more advertisements located in advertising database 442.

With reference again to embodiment 200A depicted in FIG. 2A, when controller 430 controls video content selection module 432 to select a video stream comprising a place from place/things database 441, metadata associated with the selected video stream of the place defines one or more spaces or locations within the video stream comprising the place to select for display of one or more selected video streams comprising an advertisement. Additionally, or alternatively, the one or more selected video streams comprising an advertisement further defines one or more spaces or locations within the video stream comprising the place for video content selection module 432 to select for display of one or more selected video streams comprising an advertisement. In other words, the locations within the video stream comprising the place to select for display of video streams of advertisements may depend on the selected advertisements to be displayed.

Additionally, or alternatively, the one or more video streams each essentially consisting of the representative image of the person further defines one or more spaces or locations within the video stream comprising the place for video content selection module 432 to select for display of one or more selected video streams comprising an advertisement. In other words, the locations within the video stream comprising the place to select for display of video streams of advertisements may depend on the one or more video streams each essentially consisting of the representative image of the person.

Then, video content selection module 432 selects, for example, according to step 205 in embodiment 200A, a space or location within the selected video stream comprising the place in which to display a selected video stream comprising the advertisement, based on this metadata, and/or the one or more selected video streams comprising an advertisement, and/or the one or more video streams each essentially consisting of the representative image of the person.

According to embodiment 200A, for example, video synthesis module 433 then combines at step 225 one or more video streams each essentially consisting of the representative image of the person with the selected video stream comprising the place and with the selected one or more video streams comprising an advertisement displayed at selected locations within the selected video stream comprising the place.

Video synthesis module 433, in accordance with an embodiment, for example, embodiment 200A, may first normalize at step 210 the selected video streams comprising an advertisement for display at the one or more selected locations within the selected video stream comprising the place, and then combine at step 225 the one or more video streams each essentially consisting of the representative image of the person with the selected video stream comprising the place and with the selected and normalized video streams comprising an advertisement displayed at the selected locations within the selected video stream comprising the place.

With reference to embodiment 200A depicted in FIG. 2A, when controller 430 controls video content selection module 432 to select at step 215 one or more locations within the selected video stream comprising the place from place/things database 441, in which to display the one or more video streams each essentially consisting of the representative image of the person, metadata associated with the selected video stream of the place defines one or more spaces or locations with the video stream comprising the place to select for display of the one or more video streams each essentially consisting of the representative image of the person. Additionally, or alternatively, the one or more video streams each essentially consisting of the representative image of the person further defines one or more spaces or locations within the video stream comprising the place for video content selection module 432 to select for display of the one or more video streams each essentially consisting of the representative image of the person. In other words, the locations within the video stream comprising the place to select for display of the one or more video streams each essentially consisting of the representative image of the person may depend on which (who) and/or how many video streams each essentially consisting of the representative image of the person is to be displayed.

Additionally, or alternatively, the one or more video streams comprising an advertisement further defines one or more spaces or locations within the video stream comprising the place for video content selection module 432 to select for display of each video stream essentially consisting of the representative image of the person. In other words, the locations within the video stream comprising the place to select for display of the one or more video streams each essentially consisting of the representative image of the person may depend on the one or more video streams comprising an advertisement.

Then, video content selection module 432 selects, for example, according to step 215 in embodiment 200A a space or location within the selected video stream comprising the place in which to display the one or more video streams each essentially consisting of the representative image of the person, based on this metadata, and/or the one or more selected video streams comprising an advertisement, and/or the one or more video streams each essentially consisting of the representative image of the person.

According to embodiment 200A, for example, video synthesis module 433 then combines at step 225 the selected video stream comprising the place with the one or more video streams each essentially consisting of the representative image of the person displayed at the selected one more locations within the selected video stream comprising the place and with the selected video stream comprising the advertisement displayed at the selected locations within the selected video stream comprising the place.

Video synthesis module 433, in accordance with an embodiment, for example, embodiment 200A, may first normalize at step 220 the one or more video streams each essentially consisting of the representative person for display at the selected one or more locations within the selected video stream comprising the place, and then combine at step 225 the selected video stream comprising the place with the normalized one or more video streams each essentially consisting of the representative image of the person displayed at the selected one or more of the locations within the selected video stream comprising the place and with the selected video stream comprising the advertisement.

Referring again to FIG. 1A, in accordance with embodiment 100A, controller 430 may direct content selection module 432 to receive input at step 110, for example, machine or user input, or combination thereof, to select the video stream comprising the place. User input may be received from an end-user device 415 operated by a host, participant, or person, that is to participate in, or to view, or that is viewing the synthesized, advertisement-based, video stream, or an administrator 450 of a video conferencing system that hosts the synthesized, advertisement-based, video stream, or an advertiser or representative for a company that provides pre-recorded advertising content stored in advertising database 442 for display in the synthesized, advertisement-based, video stream. For example, a person that is to be the host for a video conference, during set up and scheduling of the video conference, may select via a user interface with the video conferencing system accessed via, for example, a web browser 416 executing on an end-user device 415 the video stream comprising the place from database 441. Machine input may be provided by a video conference server 405. The machine input may rely on data, whether historical data, user data, user feedback, data gathered from previous video streams transmitted to the, or to other, end user devices, to inform selection of, or to select, the video stream of the place. This data may be stored in and accessed from analytics/history database 444. In one embodiment, selecting at step 120 the video stream comprising the place involves content selection module 432 selecting the video stream comprising the place, based on the input received at step 110, from place/things database 441.

In a similar manner, content selection module 432 may receive machine or user input, or a combination thereof, at step 115 to select a video stream comprising the advertisement from advertising database 442, and then select at step 125 the video stream comprising the advertisement from database 442 based on the input received at step 120. User input may be received from an end-user device 415 operated by a host, participant, or person, to participate in, to view, or viewing the synthesized, advertisement-based, video stream, or an administrator 450 of a video conferencing system that hosts the synthesized, advertisement-based, video stream, or an advertiser or representative for a company that provides pre-recorded advertising content stored in advertising database 442 for display in the synthesized, advertisement-based, video stream. For example, a person that is the host for a video conference, during set up and scheduling of the video conference, may select a video stream comprising the advertisement from database 442. Machine input may be provided by a video conference server 405. The machine input may rely on data accessed from database 444, whether historical data, user data, user feedback, data gathered from previous video streams transmitted to the, or to other, end user devices, to inform selection of, or to select, the video stream of the advertisement.

User feedback may come in the form of a video conference participant clicking on a link in their browser window for more information about a product or service. Alternatively, or additionally, eye tracking of the video conference participant or person viewing the synthesized, advertisement-based, video stream, may be used to determine the location or area of the display screen 417 at which the participant is looking. Accuracy of the eye-tracking depends on a number of factors, including camera type, software algorithms, and lighting. Deviation in eye-tracking is usually measured in degrees. Webcam eye tracking has a much lower accuracy than purpose-built eye trackers. While a typical remote eye tracker (e.g., the Tobii T60) has accuracy of 0.5 degrees of visual angle, a webcam produces accuracy of 2-5 degrees, provided that the video participant is not moving. Five degrees corresponds to 2.5 inches (6 cm) on a computer monitor (assuming viewing distance of 27 inches), so the actual gaze location could be anywhere within a radius of 2.5 inches from the gaze location recorded with a webcam.

Different levels of eye interactivity with advertisements can be monitored:

Level 1: just being there, persistent brand presence
Level 2: eye tracker contact
Level 3: full on click through in protected environment Each video conference participant may interact with individual advertisements in a variety of ways. The first is a visual interaction (for example, a branded can of soda is placed on a table as a product placement). The can of soda can naturally blends in with the environment (i.e., a conference room meeting "set"), where the video conference participant is viewing the branded product knowingly or unknowingly. There may be no intentional action taken by the participant and yet s/he would notice the brand of the product being present for as long as the can is present in the scene.

Another method to interact with the advertising image is passive interaction through eye tracking, where the video participant is not required to take any positive action. In this case, a virtual camera that is used to extract the image of the video conference participant is integrated with existing eye-tracking technologies to track the movement of the eyes of the video conference participant. In such integrations, object recognition algorithms are used to identify the eyes of video conference the participant and then track the movement of the eyes to correlate that movement to a particular location within the display screen 417 into which the participant is looking. Some algorithms require the participant to perform a calibration exercise which may increase the accuracy and granularity of the detection and the resulting correlation of the eye movement to the location on the display screen. However, with machine learning algorithms and a continuous learning of the user's actions, embodiments may not eventually require calibration for each participant.

For example, consider that the video conference is presented on the entire display screen (Full Screen mode) of the end user-device 415. The correlation accuracy, which may be defined as the accuracy of predicting where the video conference participant is looking, is typically dependent on the ability of the eye tracking algorithm to detect eye-movement. Suppose that the display screen is divided into a matrix of smaller 'focus' areas. The smaller the 'focus' area, the greater will be the granularity of data. Once the movement of the eyes is correlated to these 'focus' areas identifying the position on the display screen where the video conference participant was looking, an embodiment can calculate which part of the display screen and how much time the participant spent looking at that part of the display screen. For example, if the display screen is partition in a 10×10 matrix, then there are 100 sections. The eye tracking software would continuously record the eye position and assign it to the appropriate sector.

Once the data (about which part of the screen the participant looked at) is available, it can be correlated with the placement of the video stream of the advertised product or service. This will lead to a result where the embodiment can identify with sufficient accuracy whether the participant was looking at the advertised product or service or not. In addition, the embodiment may also calculate the amount of time the participant looked at the advertised product or service.

The system may choose to either report the data or analytics based on the data back to the advertiser (in terms of amount of time the participant spent in looking at their product), indicating a possible interest in the product. This may also translate to brand awareness.

Another embodiment may be actually taking a positive action and initiate a popup window asking the user to confirm their interest in the product or the brand. The embodiment may alternatively present promotional offers to the participant by providing a re-direct link that allows the video conference participant to make a direct purchase. Many such actions are possible once the video conference participant's' 'stare analytics' data is available.

In another method of interacting with these natural advertisements embedded within a video stream, is a direct click-through of that particular area of the video stream that carries the advertisement. In this case, an embodiment may choose to engage in a variety of responses including but not limited to a re-direct link, opening up a new webpage, or an application that prompts the video participant to fill out a survey, etc.

It is important to note that the eye tracking is useful not only for advertisements but also can provide information that can be a metric of how effective the meeting presenters are at engaging and holding the attention of their fellow video conference participants.

Controller 430 further directs video participant extraction module 431, working in conjunction with content selection module 432, to receive one or more video streams essentially consisting of a representative image of one or more persons from video participant database 443 or directly from video streams 420. Controller 430, according to one embodiment, directs video participant extraction module 431 and/or content selection module 432 to select which of the one or more video streams essentially consisting of a representative image of one or more persons to later combine at video synthesis module 433 with the video stream comprising a place, and the video stream comprising an advertisement. The embodiment may further include receiving input, for example, machine or user input, to use in selecting which of the received one or more video streams essentially consisting of a representative image of one or more persons to later combine with the selected video stream comprising a place, and the selected video stream comprising an advertisement.

Controller 430 further directs content selection module 432 to select a video stream comprising a place from place/things database 441. Controller 430 also directs content selection module 432 to select a video stream comprising an advertisement. Controller 430 then directs video synthesis module 433 to combine the received one or more video streams essentially consisting of the representative image of one or more persons with the video stream comprising the place and with the video stream comprising the advertisement into the synthesized, advertisement-based, video stream for transmission to end-user devices 415A, 415B, and 415C via which to display the synthesized, advertisement-based, video stream. With reference to FIG. 1B, the embodiment 101B, in contrast, contemplates receiving at step 105 one or more video streams essentially consisting of a representative image of one or more persons, just as in step 105 of embodiment 100A.

Controller 430, according to an embodiment, collects data associated with a person, a representative image of which is included in the received one or more video streams each essentially consisting of a representative image of a person. This data may be obtained from the person's participation in a video stream, from a person viewing a video stream, or from external sources of information about the person, such as a social media subscriber account associated with the person. This data may be stored in analytics/history database 444. Content selection module 432, when selecting the video stream comprising the advertisement from advertising database 442, may select the video stream comprising the advertisement based on the obtained data associated with the person, or based on an analysis of the obtained data associated with the person. Additionally, the selection of the advertisement may be based on input received to select the video stream of a particular advertisement, as described above.

Similarly, with reference to FIG. 1D, according to one embodiment of the invention 103D, controller 430 obtains at step 108 data associated with a person that is to view, or is viewing, the synthesized, advertisement-based, video stream from analytics/history database 444 and directs content selection module 432 to select at step 127 the video stream comprising the advertisement from advertising database 442 based on the obtained data associated with the person. Additionally, the selection of the advertisement may be based on input received at optional step 115 to select the video stream of a particular advertisement, as described above.

With reference to FIG. 1E, according to one embodiment of the invention 104E, controller 430 directs content selection module 432 to retrieve at step 155 the video streams of persons, place, and advertisements, and also one or more video streams each comprising a thing or object. The selection may be based on machine or user input, as described above. Embodiment 104E then involves content selection module, at the direction of controller 430, and selecting at step 175 a video stream of a place, selecting at step 180 one or more video streams of advertisements. The embodiment then involves controller 430 directing video synthesis module 433 combining at step 185 the one or more video streams each essentially consisting of the representative image of the person with the selected video stream comprising the place, with the selected one or more video streams each comprising the thing, and with the selected video streams comprising the one or more advertisements into the synthesized, advertisement-based, video stream 421 for transmission at step 190 to end-user device 415 via which to display the synthesized, advertisement-based, video stream.

As described above with reference to FIG. 1A, in accordance with embodiment 100A, controller 430 may direct content selection module 432 to receive input at step 110, for example, machine or user input, or combination thereof, to select the video stream comprising the place. According to one embodiment, a video stream of a place may constitute a conference meeting room.

Input that may be useful in selecting a video stream of a conference meeting room include characteristics or attributes of the virtual meeting that is to occur, such as, for example, and not by way of limitation, one or more of the following:

meeting date and time;
    the size of the meeting (i.e., the number of participants in the meeting);
    names, roles, profiles, interests, meeting history, of the participants;

meeting preferences, or meeting host preferences, e.g., configuration of meeting room(s), meeting room style/environment;

advertising preferences and restrictions;

product interests of one or more of the participants in the meeting;

meeting type: business, social, promotional, teaching; and guidelines for selecting, restricting, promoting, and locating certain products/brands, advertisement types (based on selected pre-defined algorithm, or user-designed, custom algorithm, or combination thereof).

Likewise, some or all of this information may be useful in selecting the video stream of an advertisement to combine with the selected video stream of a place.

According to one embodiment, these inputs may be used to identify candidates of video streams of places that can accommodate the characteristics or attributes of the meeting that is to occur, and further used to identify candidates of video streams of one or more advertisements to combine with a selected video stream of a place. Once candidates of video streams of places and candidates of video streams of advertisements are identified, an embodiment selects one of the candidates of video streams of places, with or without user or machine input, selects one of the candidates of video streams of advertisements, with or without user or machine input, and combines the selected one of the candidates of video streams of places with the selected candidates of one or more advertisements. The video streams of the one or more advertisements are positioned within, and normalized according to, the selected one of the candidates of video streams of places, for example, according to embodiment 200A described above with reference to FIG. 2A.

According to one embodiment, once the video streams of the one or more advertisements are positioned within, and normalized according to, the selected one of the candidates of video streams of places, for example, according to embodiment 200A described above with reference to FIG. 2A, the locations or spaces within the selected one of the candidates of video streams of places are identified at which to display the video streams each essentially consisting of a representative image of a person. Factors such as the number and profiles of participants in a video conference, the spacing between video conference participants, the distance between the camera and a background (i.e., wall) of the conference room, a virtual distance between the camera and video conference participants, and focal length of camera, are considered in identifying the locations or spaces within the selected one of the candidates of video streams of places at which to display the video streams each essentially consisting of a representative image of a person. The embodiment then places the video streams each essentially consisting of a representative image of a person in the identified locations or spaces. Just as the video streams of the one or more advertisements are positioned within, and normalized according to, the selected one of the candidates of video streams of places, likewise, according to an embodiment, the video streams each essentially consisting of a representative image of a person may be positioned within, and normalized according to, the selected one of the candidates of video streams of places, and the identified locations or spaces therein in which to display the video streams each essentially consisting of a representative image of a person.

According to one embodiment, once the video streams of the one or more advertisements and the video streams each essentially consisting of a representative image of a person are positioned within, and normalized according to, the selected one of the candidates of video streams of places, then the locations or spaces within the selected one of the candidates of video streams of places are identified at which to display the video streams comprising things. For example, because the video streams each essentially consisting of a representative image of a person are not complete, i.e., a participant's camera (generally cameras in laptops or mobile devices) only capture the upper body and head of the participant, placing an image of a conference room table in front of images of participants assists the objective of creating a realistic synthesized, advertisement-based, video stream. According to an embodiment, the placement of the video stream of a conference room table is therefore informed by the placement of the video streams each essentially consisting of a representative image of a person. An exposed surface of the conference room tables presents a further opportunity, i.e., location or space, for placement of a video stream of an advertisement, for example, a video stream of a can of soda.

The separate video streams of places, advertisements, representative images of persons, things, etc., can be thought of as separate layers, or separate stacking layers, wherein a stacking layer 2 is stacked on top of a stacking layer 1, and a stacking layer 3 is stacked on top of stacking layer 2. Digital composite rules may then be used to dictate or direct that populated pixels of a stacking layer n take precedence over a pixel at the same location in stacking layer n−1. The combination of the stacking layers is output as the synthesized, advertisement-based, video stream.

In a general sense, digital compositing, or simply, compositing, refers to a process of combining of visual elements from separate sources into one image. In some cases it creates the illusion that all those elements are parts of the same scene. Compositing can also include various effects to enhance that illusion, such as creating a consistent coloring and shadowing through the scene, for example, using the normalization steps described herein.

There are categorically two digital compositing methods used, the nodal method and the layered method. Embodiments of the invention contemplate use of the layered method, as it is generally faster for processing simple composite stacks. However, other digital compositing methods may be used according to embodiments of the invention. In the layered approach, images of different elements in final scenes are placed on or in different layers. The bottom layer of the stack of the layers, layer 1, is normally the background layer. Layer 2 has another set of elements that have pixels that have priority over the pixel in layer 1. In the general case the pixels of the elements in layer N have priority over those in layer N−1.

One method of mathematically calculating the pixel values of the composite image is based on alpha-compositing. In alpha-compositing an image is represented by a 4 channel RGBA matrix, where RGB is the standard red-green-blue pixel matrix and A (alpha) is an additional number for each pixel which is used to combine layers. In the more general case alpha compositing may allow a combination of the N layers to have a degree of transparency that allow some of the N−1, N−2, . . . , layers to be seen.

The case in which an RGB pixel of layer N is to be opaque, i.e., to entirely block the view of the RGB pixel of layer N−1, uses an alpha=1. Three dimensional (3D) layers that are deterministic (static, or predictably dynamic) may be pre-staged/pre-rendered to reduce the amount of processing power that is required to achieve a given latency. Predictably dynamic examples are background transparencies (windows or walls) that reveal traffic (e.g., people or vehicles) that are inserted as events (as defined above) via the controller 430 through a predetermined algorithm. Layers that have unpredictable dynamics, e.g., the participants, are not pre-rendered.

With reference again to FIG. 2A, one embodiment 200A selects at step 205 a location within a selected video stream comprising a place in which to display a selected video stream comprising an advertisement. It is appreciated that, according to the digital compositing embodiment described here, the location selected may be a composite stack of a baseline set in combination with things (including events) added to fully complete the set. The composite stack may not yet be combined with the representative images of the persons at step 205 since some of the elements may be in a foreground location (in front of the locations of one or more representative images of the persons)

It is appreciated that embodiments of the invention may output multiple synthesized, advertisement-based, video streams. In particular, one embodiment of this invention creates an output stream for each video conference participant. Optionally, each participant's stream is private—the other participants do not see it. Furthermore, the output streams can each contain multiple, different, video conference participants. Such embodiments allow the creation of side bar video conference meetings while a larger video conference meeting is ongoing. Furthermore, such embodiments allow the creation of targeted, private advertising to each of the video conference participants.

While the subject matter disclosed herein has been described by way of example and in terms of the specific embodiments, it is understood that the claimed embodiments are not limited to the explicitly enumerated embodiments disclosed. For example the sequence of operations shown in FIGS. 1A, 1B, 1C, 1D, 1E and 2A are only exemplary embodiments and there are many other embodiments that could achieve the desired results such as those described with reference to FIGS. 1F, 1G, 1H, 1I, 1J and 2B. Additional interaction is shown between some of the functional steps which infer that those functions may not performed in isolation, but in some cases there are interdependencies between those functional steps that may require an iterative process to converge on the final result.

Regarding the embodiments 100A and 100F respectively described with reference to FIGS. 1A and 1F, the following is noted: 1) step 115 can occur before step 110, or concurrently with step 110 and therefore decrease execution time, 2) step 125 can occur before step 120, or concurrently with step 120 and therefore decrease execution time, 3) step 125 may interact with step 120 such that the resulting decision on the selection of the advertisement content affects the decision on the selection of the place and vice versa.

Regarding the embodiments 100B and 100G respectively described with reference to FIGS. 1B and 1G, the following is noted: 1) steps 106, 110, and 115 are executed independently, asynchronously, for example, concurrently, which could decrease execution time over performing such steps serially, or sequentially, 2) likewise, steps 116, 120 and 125 are executed independently, asynchronously, for example, concurrently, which could decrease execution time over performing such steps serially, or sequentially, 3) steps 116, 120 and 125 interact with each other such that the resulting decision on the selection of the video stream of advertisement content, the decision on the selection of the video stream of the place and selection of the video streams of the representative images of one or more persons all affect each other.

Figure 1H:
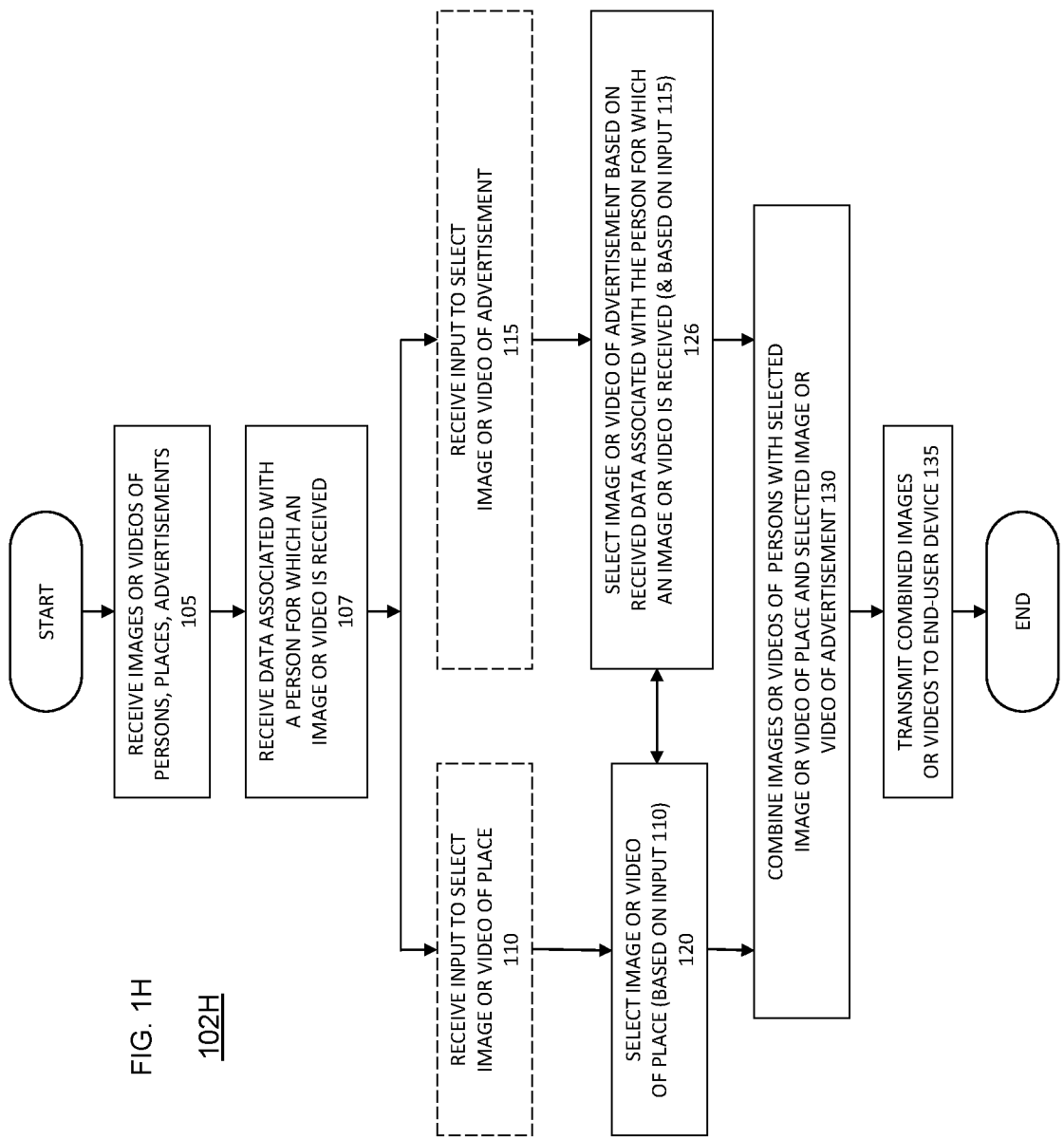
FIG. 1H is a flowchart of a method in accordance with an embodiment of the invention.

Regarding the embodiments 100C and 100H respectively described with reference to FIGS. 1C and 1H, the following is noted: 1) step 115 can occur before step 110, or concurrently with step 110 and therefore decrease execution time, 2) step 126 can occur before step 120 or concurrently with step 126 and therefore decrease execution time, 3) step 126 interacts with step 120 such that the resulting decision on the selection of the video stream of the advertisement content affects the decision on the selection of the video stream of the place and vice versa.

Regarding the embodiments 100D and 100I respectively described with reference to FIGS. 1D and 1I, the following is noted: 1) step 115 can occur before step 110, or concurrently with step 110 and therefore decrease execution time, 2) step 127 can occur before step 120, or concurrently with step 110 and therefore decrease execution time, 3) step 127 interacts with step 120 such that the resulting decision on the selection of the video steam of the advertisement content affects the decision on the selection of the video stream of the place and vice versa.

Regarding embodiments 100E and 100J respectively described with reference to FIGS. 1E and 1J, the following is noted: 1) steps 156, 160, and 165 may be executed independently, asynchronously, for example, concurrently, which may decrease execution time, 2) steps 170, 175 and 180, may be executed independently, asynchronously, for example, concurrently and interact with each other such that the resulting decision on the selection of the video stream of the advertisement content, the decision of the selection of the video stream of the place and the selection of the video streams of the things all affect each other.

Regarding embodiments 200A and 200B respectively described with reference to FIGS. 2A and 2B, the following is noted: 1) step 205 and step 215 may execute one before the other, or concurrently, 2) step 210 and 220 may execute one before the other, or concurrently, 3) step 205 may interact with step 210 such that the resulting decision on the selection of the location of the placement of the video stream of advertisement content affects the decision on the selection of the location of the placement of the video streams of representative images of persons and vice versa and 4) step 210 may interact with step 220 such that the normalization chosen for the video stream of advertisement content at the selected location affects the normalization chosen for the persons at their respective locations, and vice versa.

Thus, embodiment of the invention include a video conferencing system that provides a synthesized, advertisement-based, video stream, comprising: a first input to receive a plurality of video streams each essentially consisting of a representative image of a person; a second input to receive a plurality of video streams each comprising a place; a third input to receive a plurality of video streams each comprising an advertisement; control logic to select, from the received plurality of video streams each comprising a place, a video stream comprising a place; control logic to select, from the received plurality of video streams each comprising an advertisement, a video stream comprising an advertisement; and video stream synthesis logic to combine the plurality of video streams each essentially consisting of the representative image of the person with the selected video stream comprising the place and with the selected video stream comprising the advertisement into the synthesized, advertisement-based, video stream for transmission to an end-user device via which to display the synthesized, advertisement-based, video stream.

In one embodiment of the video conferencing system, the video stream synthesis logic to combine the plurality of video streams each essentially consisting of the representative image of the person with the selected video stream comprising the place and with the selected video stream comprising the advertisement into the synthesized, advertisement-based, video stream, comprises: selection logic to select a location within the selected video stream comprising the place in which to display the selected video stream comprising the advertisement; and logic to combine the plurality of video streams each essentially consisting of the representative image of the person with the selected video stream comprising the place and with the selected video stream comprising the advertisement displayed at the selected location within the selected video stream comprising the place.

In one embodiment of the video conferencing system, the video stream synthesis logic to combine the plurality of video streams each essentially consisting of the representative image of the person with the selected video stream comprising the place and with the selected video stream comprising the advertisement displayed at the selected location within the selected video stream comprising the place comprises: normalization logic to normalize the selected video stream comprising the advertisement for display at the selected location within the selected video stream comprising the place; and logic to combine the plurality of video streams each essentially consisting of the representative image of the person with the selected video stream comprising the place and with the selected and normalized video stream comprising the advertisement displayed at the selected location within the selected video stream comprising the place.

In one embodiment of the video conferencing system, the video stream synthesis logic to combine the plurality of video streams each essentially consisting of the representative image of the person with the selected video stream comprising the place and with the selected video stream comprising the advertisement into the synthesized, advertisement-based, video stream, comprises: selection logic to select a plurality locations within the selected video stream comprising the place in which to display the plurality of video streams each essentially consisting of the representative image of the person; and logic to combine the selected video stream comprising the place with the plurality of video streams each essentially consisting of the representative image of the person displayed at the selected plurality of locations within the selected video stream comprising the place and with the selected video stream comprising the advertisement.

In one embodiment of the video conferencing system, the video stream synthesis logic to combine the selected video stream comprising the place with the plurality of video streams each essentially consisting of the representative image of the person displayed at the selected plurality of locations within the selected video stream comprising the place and with the selected video stream comprising the advertisement, comprises: normalization logic to normalize the plurality of video streams each essentially consisting of the representative person for display at the selected plurality of locations within the selected video stream comprising the place; and logic to combine the selected video stream comprising the place with the normalized plurality of video streams each essentially consisting of the representative image of the person displayed at the selected plurality of locations within the selected video stream comprising the place and with the selected video stream comprising the advertisement.

In one embodiment of the video conferencing system, the first input to receive the plurality of video streams each essentially consisting of the representative image of the person comprises: an interface to receive a plurality of video streams each comprising one or more persons; and extraction logic coupled to the interface to extract, from each of the plurality of video streams, a portion of the video stream that essentially consists of a representative image of the person.

One embodiment of the video conferencing system further comprises the selection logic receiving input to select the video stream comprising the place; and wherein the selection logic to select the video stream comprising the place comprises selection logic to select the video stream comprising the place, based on the received input.

One embodiment of the video conferencing system further comprises the selection logic receiving input to select the video stream comprising the advertisement; and wherein the selection logic to select the video stream comprising the advertisement comprises selection logic to select the video stream comprising the advertisement, based on the received input.

One embodiment of the video conferencing system further comprises a data analytics module to obtain data associated with a person, a representative image of which is included in the received plurality of video streams each essentially consisting of a representative image of a person; and wherein the selection logic to select the video stream comprising the advertisement comprises the selection logic to select the video stream comprising the advertisement based on the obtained data.

One embodiment of the video conferencing system further comprises a data analytics module to obtain data associated with a person to view, or viewing, the synthesized, advertisement-based, video stream transmitted to an end-user device; and wherein the selection logic to select the video stream comprising the advertisement comprises selection logic to select the video stream comprising the advertisement based on the obtained data.

On embodiment of the video conferencing system further comprises: an output port to transmit the synthesized, advertisement-based, video stream to the end-user device via which to display the synthesized, advertisement-based, video stream; an analytics module to receive data regarding the synthesized, advertisement-based, video stream transmitted to the end-user device; selection logic to select, from the received plurality of video streams, a video stream comprising a new advertisement, based on the received data; and logic to combine the plurality of video streams each essentially consisting of the representative image of the person with the selected video stream comprising the place and with the selected video stream comprising the new advertisement into a subsequent synthesized, advertisement-based, video stream for transmission to an end-user device via which to display the subsequent synthesized, advertisement-based, video stream.

One embodiment of the video conferencing system further comprises: a fourth input to receive a plurality of video streams each comprising a thing; selection logic to select, from the received plurality of video streams each comprising a thing, a video stream comprising a thing; and wherein the logic to combine the plurality of video streams each essentially consisting of the representative image of the person with the selected video stream comprising the place and with the selected video stream comprising the advertisement into the synthesized, advertisement-based, video stream for transmission to an end-user device via which to display the synthesized, advertisement-based, video stream comprises logic to combine the plurality of video streams each essentially consisting of the representative image of the person with the selected video stream comprising the place, with the selected video stream comprising the thing, and with the selected video stream comprising the advertisement into the synthesized, advertisement-based, video stream for transmission to an end-user device via which to display the synthesized, advertisement-based, video stream.

Thus, embodiments of the invention include a non-transitory computer readable storage media having instructions stored thereon that, when executed by a computer having at least a processor and a memory therein, cause the computer to provide a synthesized, advertisement-based, video stream, comprising the steps of: receiving a plurality of digital images or video streams (hereinafter a "plurality of video streams") each essentially consisting of a representative image of a person; receiving a plurality of video streams each comprising a place; receiving a plurality of video streams each comprising an advertisement; selecting, from the received plurality of video streams each comprising a place, a video stream comprising a place; selecting, from the received plurality of video streams each comprising an advertisement, a video stream comprising an advertisement; and combining the plurality of video streams each essentially consisting of the representative image of the person with the selected video stream comprising the place and with the selected video stream comprising the advertisement into the synthesized, advertisement-based, video stream for transmission to an end-user device via which to display the synthesized, advertisement-based, video stream.

In one embodiment of the non-transitory computer readable storage media, combining the plurality of video streams each essentially consisting of the representative image of the person with the selected video stream comprising the place and with the selected video stream comprising the advertisement into the synthesized, advertisement-based, video stream, comprises: selecting a location within the selected video stream comprising the place in which to display the selected video stream comprising the advertisement; and combining the plurality of video streams each essentially consisting of the representative image of the person with the selected video stream comprising the place and with the selected video stream comprising the advertisement displayed at the selected location within the selected video stream comprising the place.

In one embodiment of the non-transitory computer readable storage media, combining the plurality of video streams each essentially consisting of the representative image of the person with the selected video stream comprising the place and with the selected video stream comprising the advertisement displayed at the selected location within the selected video stream comprising the place comprises: normalizing the selected video stream comprising the advertisement for display at the selected location within the selected video stream comprising the place; and combining the plurality of video streams each essentially consisting of the representative image of the person with the selected video stream comprising the place and with the selected and normalized video stream comprising the advertisement displayed at the selected location within the selected video stream comprising the place.

In one embodiment of the non-transitory computer readable storage media, combining the plurality of video streams each essentially consisting of the representative image of the person with the selected video stream comprising the place and with the selected video stream comprising the advertisement into the synthesized, advertisement-based, video stream, comprises: selecting a plurality locations within the selected video stream comprising the place in which to display the plurality of video streams each essentially consisting of the representative image of the person; and combining the selected video stream comprising the place with the plurality of video streams each essentially consisting of the representative image of the person displayed at the selected plurality of locations within the selected video stream comprising the place and with the selected video stream comprising the advertisement.

In one embodiment of the non-transitory computer readable storage media, combining the selected video stream comprising the place with the plurality of video streams each essentially consisting of the representative image of the person displayed at the selected plurality of locations within the selected video stream comprising the place and with the selected video stream comprising the advertisement, comprises: normalizing the plurality of video streams each essentially consisting of the representative person for display at the selected plurality of locations within the selected video stream comprising the place; and combining the selected video stream comprising the place with the normalized plurality of video streams each essentially consisting of the representative image of the person displayed at the selected plurality of locations within the selected video stream comprising the place and with the selected video stream comprising the advertisement.

In one embodiment of the non-transitory computer readable storage media, receiving the plurality of video streams each essentially consisting of the representative image of the person comprises: receiving a plurality of video streams each comprising one or more persons; and extracting, from each of the plurality of video streams, a portion of the video stream that essentially consists of a representative image of the person.

One embodiment of the non-transitory computer readable storage media further comprises instructions for receiving input for selecting the video stream comprising the place; and wherein selecting the video stream comprising the place comprises selecting the video stream comprising the place, based on the received input.

One embodiment of the non-transitory computer readable storage media further comprises instructions for receiving input for selecting the video stream comprising the advertisement; and wherein selecting the video stream comprising the advertisement comprises selecting the video stream comprising the advertisement, based on the received input.

One embodiment of the non-transitory computer readable storage media further comprises instructions for obtaining data associated with a person, a representative image of which is included in the received plurality of video streams each essentially consisting of a representative image of a person; and wherein selecting the video stream comprising the advertisement comprises selecting the video stream comprising the advertisement based on the obtained data.

One embodiment of the non-transitory computer readable storage media further comprises instructions for obtaining data associated with a person to view, or viewing, the synthesized, advertisement-based, video stream transmitted to an end-user device; and wherein selecting the video stream comprising the advertisement comprises selecting the video stream comprising the advertisement based on the obtained data.

One embodiment of the non-transitory computer readable storage media further comprises instructions for: transmitting the synthesized, advertisement-based, video stream to the end-user device via which to display the synthesized, advertisement-based, video stream; receiving data regarding the synthesized, advertisement-based, video stream transmitted to the end-user device; selecting, from the received plurality of video streams, a video stream comprising a new advertisement, based on the received data; and combining the plurality of video streams each essentially consisting of the representative image of the person with the selected video stream comprising the place and with the selected video stream comprising the new advertisement into a subsequent synthesized, advertisement-based, video stream for transmission to an end-user device via which to display the subsequent synthesized, advertisement-based, video stream.

One embodiment of the non-transitory computer readable storage media further comprises instructions for: receiving a plurality of video streams each comprising a thing; selecting, from the received plurality of video streams each comprising a thing, a video stream comprising a thing; and wherein combining the plurality of video streams each essentially consisting of the representative image of the person with the selected video stream comprising the place and with the selected video stream comprising the advertisement into the synthesized, advertisement-based, video stream for transmission to an end-user device via which to display the synthesized, advertisement-based, video stream comprises combining the plurality of video streams each essentially consisting of the representative image of the person with the selected video stream comprising the place, with the selected video stream comprising the thing, and with the selected video stream comprising the advertisement into the synthesized, advertisement-based, video stream for transmission to an end-user device via which to display the synthesized, advertisement-based, video stream.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a video participant extraction module 524 and a content selection module 525 and a video synthesis module 523 by which to communicate with each other as in described embodiments. Main memory 504 and its sub-elements are operable in conjunction with processing logic 526 and processor 502 to perform the methodologies discussed herein.

Processor 502 represents one or more general-purpose processing devices such as a microprocessor, central processing unit, co-processor, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as a graphics processor, an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display, etc.), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable storage medium or a non-transitory computer readable storage medium or a non-transitory machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

In this description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described above. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for combining a plurality of separate digital images or video streams (hereinafter a "plurality of video streams") of persons into a single, synthesized, advertisement-based, video stream of a virtual scene, comprising:

receiving a plurality of video streams each essentially consisting of a representative image of a person;

receiving a plurality of video streams each comprising a place;

receiving a plurality of video streams each comprising an advertisement;

selecting, from the received plurality of video streams each comprising a place, a video stream comprising a place based on input from an advertiser or analytic/history feedback obtained from an analytics/history database regarding one or more previously transmitted synthesized, advertisement-based, video streams of the virtual scene;

selecting, from the received plurality of video streams each comprising an advertisement, a video stream comprising an advertisement based on the selected video stream comprising the place; and combining the plurality of video streams each essentially consisting of the representative image of the person with the selected video stream comprising the place and with the selected video stream comprising the advertisement into the synthesized, advertisement-based, video stream of the virtual scene for transmission to an end-user device via which to display the synthesized, advertisement-based, video stream of the virtual scene in such a manner as to display the video streams each essentially consisting of the representative image of the person in a selected first location within the selected video stream of the place, and to display the selected video stream of the advertisement in a selected second location within the selected video stream comprising the place.

2. The method of claim 1, wherein combining the plurality of video streams each essentially consisting of the representative image of the person with the selected video stream comprising the place and with the selected video stream comprising the advertisement into the synthesized, advertisement-based, video stream of the virtual scene in such a manner as to display the selected video stream of the advertisement in the selected second location within the selected video stream comprising the place, comprises:

selecting the selected second location within the selected video stream comprising the place in which to display the selected video stream comprising the advertisement.

3. The method of claim 2, wherein combining the plurality of video streams each essentially consisting of the representative image of the person with the selected video stream comprising the place and with the selected video stream comprising the advertisement into the synthesized, advertisement-based, video stream of the virtual scene in such a manner as to display the selected video stream of the advertisement in displayed at the selected second location within the selected video stream comprising the place comprises:

normalizing the selected video stream comprising the advertisement for display at the selected second location within the selected video stream comprising the place; and combining the plurality of video streams each essentially consisting of the representative image of the person with the selected video stream comprising the place and with the selected and normalized video stream comprising the advertisement displayed at the selected second location within the selected video stream comprising the place.

4. The method of claim 1, wherein the selected first location within the selected video stream of the place is a foreground region within the selected video stream of the place; and
   wherein combining the plurality of video streams each essentially consisting of the representative images of the persons with the selected video stream comprising the place and with the selected video stream comprising the advertisement into the synthesized, advertisement-based, video stream of the virtual scene, comprises:
   selecting a plurality of locations within the foreground region of the selected video stream comprising the place in which to display respective ones of the plurality of video streams each essentially consisting of the representative image of the person; and
   combining the selected video stream comprising the place with the plurality of video streams each essentially consisting of the representative image of the person displayed at the selected plurality of locations within the foreground region of the selected video stream comprising the place and with the selected video stream comprising the advertisement.

5. The method of claim 4, wherein combining the selected video stream comprising the place with the plurality of video streams each essentially consisting of the representative image of the person displayed at the selected plurality of locations within the foreground region of the selected video stream comprising the place and with the selected video stream comprising the advertisement, comprises:
   normalizing the plurality of video streams each essentially consisting of the representative person for display at the selected plurality of locations within the foreground region of the selected video stream comprising the place; and
   combining the selected video stream comprising the place with the normalized plurality of video streams each essentially consisting of the representative image of the person displayed at the selected plurality of locations within the foreground region of the selected video stream comprising the place and with the selected video stream comprising the advertisement.

6. The method of claim 1, wherein receiving the plurality of video streams each essentially consisting of the representative image of the person comprises:
   receiving a plurality of video streams each comprising one or more persons; and
   extracting, from each of the plurality of video streams, a portion of the video stream that essentially consists of a representative image of the person.

7. The method of claim 1 further comprising receiving input for selecting the video stream comprising the advertisement; and
   wherein selecting the video stream comprising the advertisement based on the selected video stream comprising the place comprises selecting the video stream comprising the advertisement, further based on the received input.

8. The method of claim 1, further comprising obtaining data associated with a person, a representative image of which is included in the received plurality of video streams each essentially consisting of a representative image of a person; and
   wherein selecting the video stream comprising the advertisement based on the selected video stream comprising the place comprises selecting the video stream comprising the advertisement further based on the obtained data.

9. The method of claim 1, further comprising obtaining data associated with a person to view, or viewing, the synthesized, advertisement-based, video stream of the virtual scene transmitted to an end-user device; and
   wherein selecting the video stream comprising the advertisement based on the selected video stream comprising the place comprises selecting the video stream comprising the advertisement further based on the obtained data.

10. The method of claim 1, further comprising:
   transmitting the synthesized, advertisement-based, video stream of the virtual scene to the end-user device via which to display the synthesized, advertisement-based, video stream of the virtual scene;
   receiving data regarding the synthesized, advertisement-based, video stream of the virtual scene transmitted to the end-user device;
   selecting, from the received plurality of video streams, a video stream comprising a new advertisement, based on the received data; and
   combining the plurality of video streams each essentially consisting of the representative image of the person with the selected video stream comprising the place and with the selected video stream comprising the new advertisement into a subsequent synthesized, advertisement-based, video stream of a new virtual scene for transmission to an end-user device via which to display the subsequent synthesized, advertisement-based, video stream of the new virtual scene.

11. The method of claim 1, further comprising:
   receiving a plurality of video streams each comprising a thing;
   selecting, from the received plurality of video streams each comprising a thing, a video stream comprising a thing; and
   wherein combining the plurality of video streams each essentially consisting of the representative image of the person with the selected video stream comprising the place and with the selected video stream comprising the advertisement into the synthesized, advertisement-based, video stream of the virtual scene for transmission to an end-user device via which to display the synthesized, advertisement-based, video stream of the virtual scene comprises combining the plurality of video streams each essentially consisting of the representative image of the person with the selected video stream comprising the place, with the selected video stream comprising the thing, and with the selected video stream comprising the advertisement into the synthesized, advertisement-based, video stream of the virtual scene for transmission to an end-user device via which to display the synthesized, advertisement-based, video stream of the virtual scene.

12. The method of claim 1, wherein selecting, from the received plurality of video streams each comprising a place, a video stream comprising a place further comprises selecting, from the received plurality of video streams each comprising a place, a video stream comprising a place based on the selected video stream comprising the advertisement from the received plurality of video streams each comprising an advertisement.

13. The method of claim 1, wherein selecting, from the received plurality of video streams each comprising the thing, the video stream comprising the thing, comprises selecting, from the received plurality of video streams each comprising the thing, the video stream comprising the thing based on the selected video stream comprising the place.

14. A method for combining a plurality of separate digital images or video streams (hereinafter a "plurality of video streams") of video conference participants participating in a video conference into a synthesized, advertising-based, video conference stream comprising a virtual scene of the video conference participants meeting together in a virtual place, comprising:

receiving a plurality of video streams each comprising one or more video conference participants;

extracting a representative portion of a video stream of each of the video conference participants from the plurality of video streams each comprising the one or more video conference participants;

receiving a plurality of video streams of virtual places;

receiving a plurality of video streams of advertisements;

selecting one or more of the plurality of video streams of advertisements to display in one of the plurality of video streams of virtual places based on a selected video stream comprising a place;

selecting one of the plurality of video streams of the virtual places in which to display the representative portion of the video stream of each of the video conference participants, and in which to display the selected one or more of the plurality of video streams of advertisements based on input from an advertiser or analytic/history feedback obtained from an analytics/history database regarding one or more previously transmitted synthesized, advertisement-based, video conferencing streams comprising the virtual scene;

combining into the synthesized, advertising-based, video conference stream comprising the virtual scene of the video conference participants meeting together in the virtual place, the representative portion of the video stream of each of the video conference participants with the selected one of the plurality of video streams of the virtual places and with the selected one or more of the plurality of video streams of the advertisements in such a manner as to display the representative portion of each of the video conference participants in a selected first location in the selected one of the plurality of video streams of the virtual places, and to display the selected one or more of the plurality of video streams of advertisements in a selected second location in the selected one of the plurality of video stream of virtual places; and transmitting the synthesized, advertising-based, video conference stream comprising the virtual scene of the video conference participants meeting together in the virtual place to end-user devices for display to the video conference participants.

15. A video conferencing system that combines a plurality of separate digital images or video streams (hereinafter a "plurality of video streams") of persons into a synthesized, advertisement-based, video stream of a virtual scene, comprising:

a processor to execute a video participant extraction module to extract from the plurality of video streams of persons a plurality of video streams each essentially consisting of a representative image of a person;

the processor to execute a video content selection module to select, from among a plurality of video streams each comprising a place stored in a database, a video stream comprising a place based on input from an advertiser or analytic/history feedback obtained from an analytics/history database regarding one or more previously transmitted synthesized, advertisement-based, video streams of the virtual scene;

the processor to execute the video content selection module further to select, from among a plurality of video streams each comprising an advertisement stored in the database, a video stream comprising an advertisement based on the selected video stream comprising the place; and the processor to execute video stream synthesis module to combine the plurality of video streams each essentially consisting of the representative image of the person with the selected video stream comprising the place and with the selected video stream comprising the advertisement into the synthesized, advertisement-based, video stream of the virtual scene in such a manner as to display the representative image of the person in a selected first location in the selected video stream comprising the place and with the video stream comprising the advertisement in a selected second location in the selected video stream comprising the place for transmission to an end-user device via which to display the synthesized, advertisement-based, video stream of the virtual scene.

16. Non-transitory computer readable storage media having instructions stored thereon that, when executed by a computer having at least a processor and a memory therein, cause the computer to combine a plurality of separate digital images or video streams (hereinafter a "plurality of video streams") of persons into a synthesized, advertisement-based, video stream of a virtual scene, comprising the steps of:

receiving a plurality of video streams each essentially consisting of a representative image of a person;

receiving a plurality of video streams each comprising a place;

receiving a plurality of video streams each comprising an advertisement;

selecting, from the received plurality of video streams each comprising a place, a video stream comprising a place based on input from an advertiser or analytic/history feedback obtained from an analytics/history database regarding one or more previously transmitted synthesized, advertisement-based, video streams of the virtual scene;

selecting, from the received plurality of video streams each comprising an advertisement, a video stream comprising an advertisement based on the selected video stream comprising the place; and combining the plurality of video streams each essentially consisting of the representative image of the person with the selected video stream comprising the place and with the selected video stream comprising the advertisement into the synthesized, advertisement-based, video stream of the virtual scene for transmission to an end-user device via which to display the synthesized, advertisement-based, video stream of the virtual scene in such a manner as to display the video streams each essentially consisting of the representative image of the person in a selected first location within the selected video stream of the place, and to display the selected video stream of the advertisement in a selected second location within the selected video stream comprising the place.

17. The non-transitory computer readable storage media of claim 16, having further instructions stored thereon that, when executed by the computer, cause the computer to combine the plurality of video streams of persons into the synthesized, advertisement-based, video stream of the virtual scene, comprising the steps of:

transmitting the synthesized, advertisement-based, video stream of the virtual scene to the end-user device;

receiving data from an analytics/history database regarding one or more previously transmitted synthesized, advertisement-based, video streams of the virtual scene;

selecting, from the plurality of video streams each comprising an advertisement, one or more video streams each comprising a new advertisement, based on the received data;

combining the video streams each essentially consisting of the representative image of the person with the selected video stream comprising the place and with the selected video streams comprising the new advertisements into a subsequent synthesized, advertisement-based, video stream for transmission to an end-user device via which to display the subsequent synthesized, advertisement-based, video stream.

\* \* \* \* \*